United States Patent
Cherry et al.

(10) Patent No.: US 10,486,756 B2
(45) Date of Patent: Nov. 26, 2019

(54) TIRE CARRIERS FOR USE WITH VEHICLES

(71) Applicant: Ford Global Technologies, LLC, Dearborn, MI (US)

(72) Inventors: William Reese Cherry, Madison Heights, MI (US); Matt B. Rutman, Canton, MI (US); Jared Shroyer, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 79 days.

(21) Appl. No.: 15/722,395

(22) Filed: Oct. 2, 2017

(65) Prior Publication Data
US 2019/0100259 A1  Apr. 4, 2019

(51) Int. Cl.
| | |
|---|---|
| *B65D 43/02* | (2006.01) |
| *B62D 43/02* | (2006.01) |
| *B62D 43/00* | (2006.01) |
| *F16F 9/02* | (2006.01) |
| *F16B 7/14* | (2006.01) |
| *F16B 2/24* | (2006.01) |
| *B60R 9/06* | (2006.01) |

(52) U.S. Cl.
CPC ........... *B62D 43/02* (2013.01); *B62D 43/002* (2013.01); *F16B 2/246* (2013.01); *F16B 7/14* (2013.01); *F16F 9/0254* (2013.01); *B60R 9/06* (2013.01)

(58) Field of Classification Search
CPC ......... B62D 43/02; B62D 43/002; F16B 7/14; F16F 9/0254

USPC ....................................................... 224/42.21
See application file for complete search history.

(56) References Cited

U.S. PATENT DOCUMENTS

| | | | |
|---|---|---|---|
| 4,717,054 A | 1/1988 | Vanzant | |
| 5,186,371 A * | 2/1993 | Jozefczak | ............ B62D 43/002 224/42.21 |
| 5,595,410 A * | 1/1997 | Wilson | .................. E05C 19/008 292/259 R |
| 6,659,318 B2 | 12/2003 | Newbill | |
| 7,021,685 B2 * | 4/2006 | Newbill | .................. B60R 19/48 224/42.12 |

(Continued)

FOREIGN PATENT DOCUMENTS

| | | |
|---|---|---|
| CN | 2902846 | 5/2007 |
| CN | 201895717 | 7/2011 |

(Continued)

OTHER PUBLICATIONS

ArmyProperty.com, "Drop-Down Spare Tire Carrier—Mechanical Assist," 2013, 2 pages. <http://www.armyproperty.com/EquipmentInfo/Accessories/MASTC.htm>.

*Primary Examiner* — Derek J Battisti
(74) *Attorney, Agent, or Firm* — Vichit Chea; Hanley, Flight & Zimmerman, LLC

(57) ABSTRACT

Tire carriers for use with vehicles are disclosed herein. An example tire carrier, includes a frame including telescopically coupled tubes; and a lock carried by one of the tubes, the lock structured to mechanically engage another one of the tubes to fix the tubes relative to one another to prevent the tire carrier from inadvertently moving toward a lowered position, the lock structured to reduce the mechanical engagement with the other one of the tubes to enable the tire carrier to be moved toward a raised position.

19 Claims, 24 Drawing Sheets

(56) References Cited

U.S. PATENT DOCUMENTS

| | | | |
|---|---|---|---|
| 7,845,895 B2 * | 12/2010 | Barie | B60S 9/12 |
| | | | 414/427 |
| 8,540,125 B2 | 9/2013 | Newbill | |
| 2002/0018908 A1 * | 2/2002 | Smith | B21B 1/227 |
| | | | 428/600 |
| 2002/0040917 A1 * | 4/2002 | Newbill | B60R 9/06 |
| | | | 224/503 |
| 2002/0084298 A1 * | 7/2002 | Essig | B62D 43/02 |
| | | | 224/509 |
| 2003/0024958 A1 * | 2/2003 | Slovick | B62D 43/002 |
| | | | 224/42.21 |
| 2004/0012210 A1 * | 1/2004 | Guidetti | F16B 2/246 |
| | | | 292/303 |
| 2004/0222261 A1 * | 11/2004 | Wilson | B60R 9/06 |
| | | | 224/509 |
| 2008/0011793 A1 * | 1/2008 | Newbill | B62D 43/02 |
| | | | 224/42.21 |

FOREIGN PATENT DOCUMENTS

| | | |
|---|---|---|
| DE | 10311574 | 9/2004 |
| EP | 0426628 | 10/1990 |
| GB | 539624 | 5/1940 |

* cited by examiner

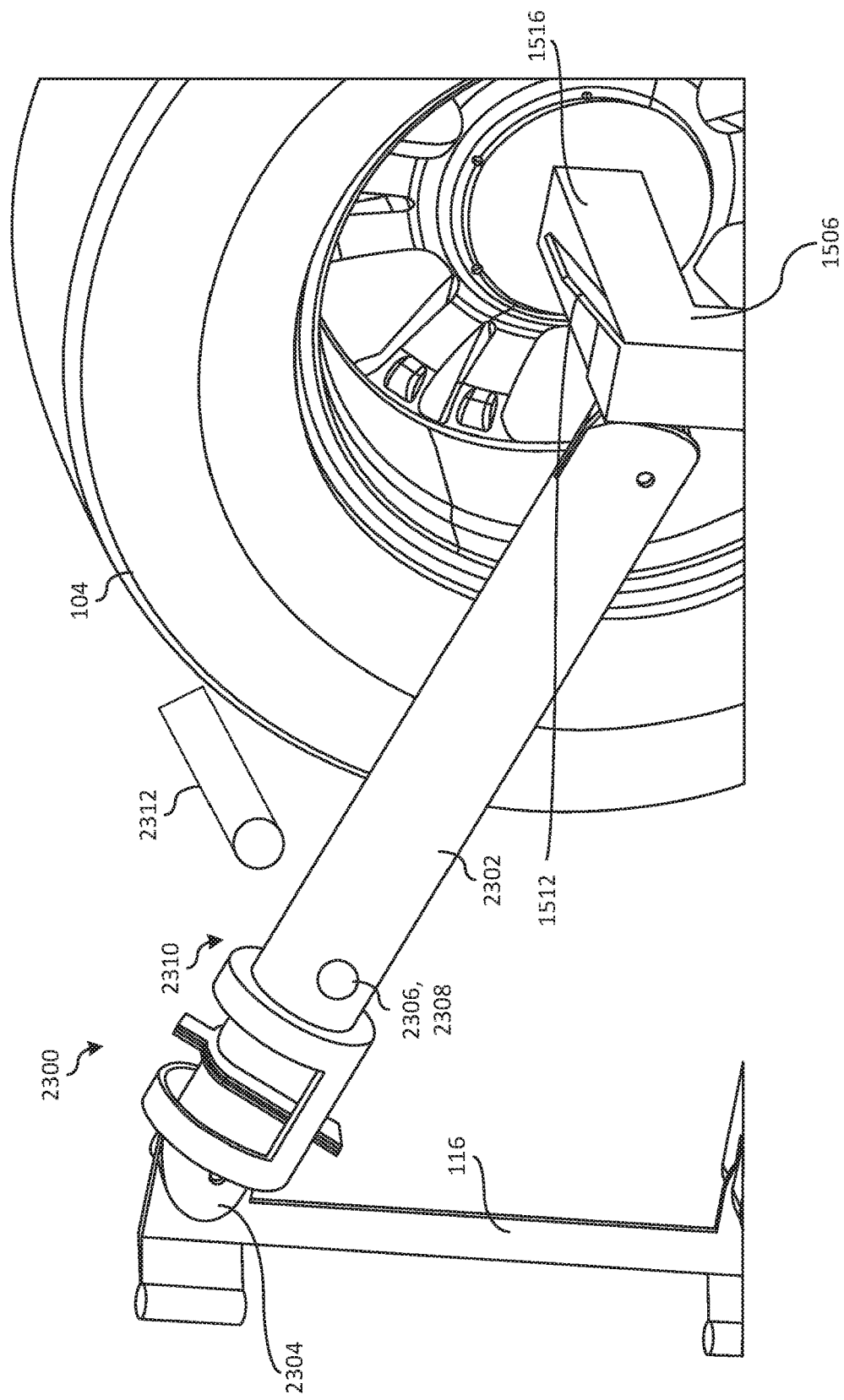

TIRE CARRIERS FOR USE WITH VEHICLES

FIELD OF THE DISCLOSURE

This disclosure relates generally to vehicles and, more particularly, to tire carriers for use with vehicles.

BACKGROUND

Some vehicles include spare tires that are attached to tire carriers. The tire carriers may be mounted on the front or the rear of the vehicle.

BRIEF DESCRIPTION OF THE DRAWINGS

FIG. 23 illustrates a detailed isometric view of an example tire carrier including an example lock to secure a tire carrier in a raised position.

The figures are not to scale. Wherever possible, the same reference numbers will be used throughout the drawing(s) and accompanying written description to refer to the same or like parts.

DETAILED DESCRIPTION

Figure 1:
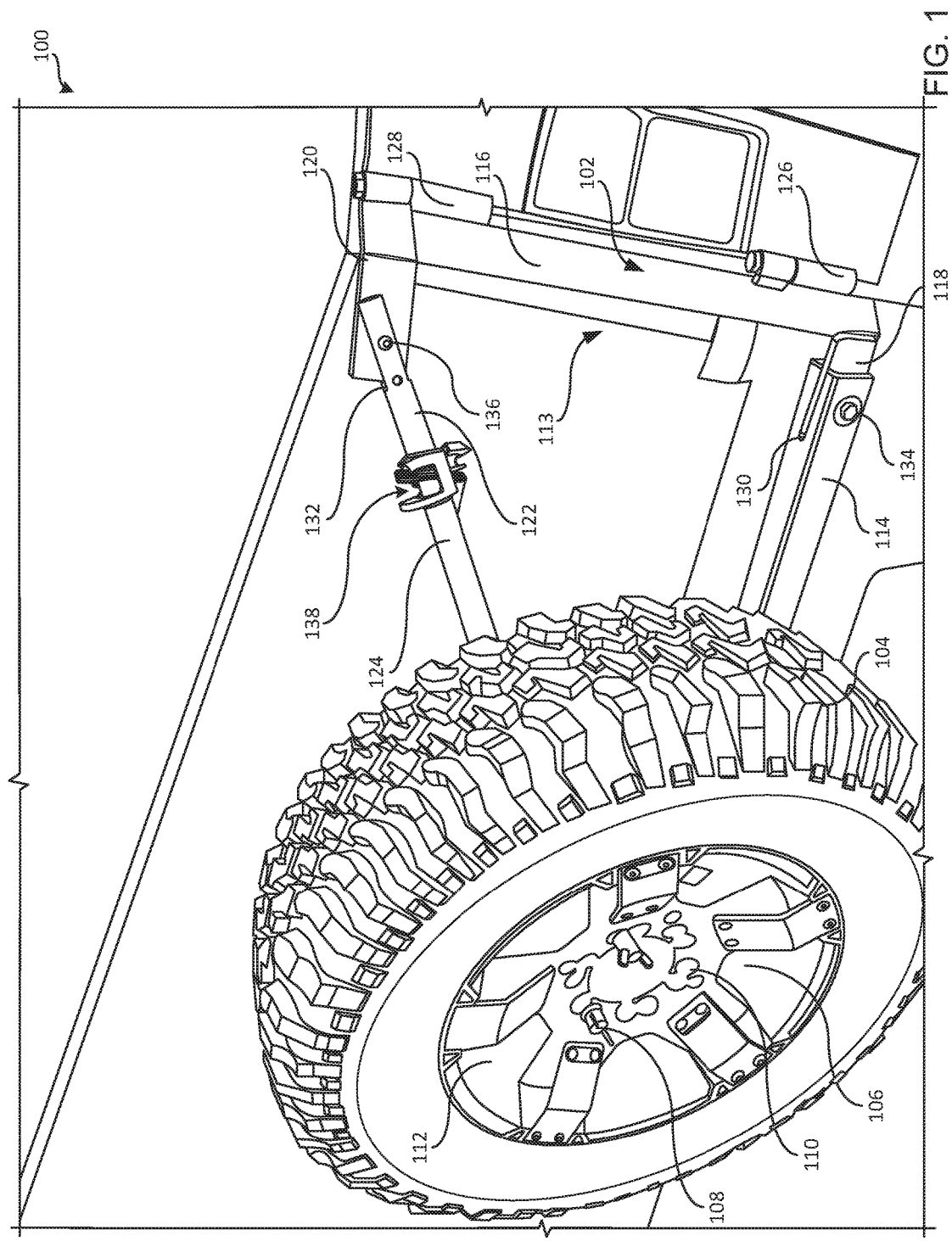
FIG. 1 illustrates an example vehicle including an example tire carrier in a raised position with a distal end of the tire carrier immediately adjacent the vehicle.

The examples disclosed herein relate to adjustable height tire carriers for use with vehicles. In some examples, the tire carriers include an example self-locking clamp that prevents the tire carriers from inadvertently lowering but which enables the tire carrier to be easily raised. Thus, the example tire carriers disclosed herein can be raised from the lowered position to a mid-travel position and then further raised from the mid-travel position to a raised position without the tire carrier inadvertently lowering during the process.

In some examples, the tire carriers include an example step that may be used to assist a person entering a rear of a vehicle implemented with the example tire carriers. For example, when the tire carrier is in the lowered position, a person may step on the step to assist the person with entering the vehicle (e.g., entering a bed of the vehicle) and/or assist the person with accessing the roof of the vehicle. In some examples, the step may be structured to be used as a handle that may be held by a person to assist with raising and/or lowering the example tire carrier. Alternatively, the example tire carrier may be provided with a step and a handle.

In some examples, in the lowered position, a spare tire is easily alignable with lugs of the tire carrier to enable the spare tire to be positioned on the tire carrier without having to lift the spare tire off the ground during the process. Thus, the examples disclosed herein provide an ergonomic tire carrier for vehicles, including off-road vehicles, that enable the spare tire to be moved to a raised, stowed position without a person having to lift the tire the entire distance prior to attaching the tire to the tire carrier (e.g., spare tires may be approximately one-hundred pounds).

When the example tire carriers are in a lowered position, in some examples, the tire carriers are structured to enable a person to use the tire as a seat during, for example, a social scenario, a camping scenario, a tailgating scenario, etc., or, more generally, a situation in which people are gathering and/or socializing around the vehicle. When the example tire carrier is in the lowered position, in some examples, the tire carriers are structured to be out of a line of sight or the peripheral vision of a person sitting on a tailgate of a vehicle implemented with the example tire carrier during, for example, a social scenario, a camping scenario, a tailgating scenario, etc., or, more generally, a situation in which people are gathering and/or socializing around the vehicle To enable a tire carried by the example tire carriers to be lowered into engagement with the ground, in some examples, the tire carrier includes a first elongate member or tube, a second elongate member or tube, third and fourth elongate members or tubes that are telescopically coupled and a fifth elongate member or tube. While the tubes may be arranged in different ways such that the third and fourth tubes are disposed on one of the sides of the tire carrier and/or on the bottom of the tire carrier, in some examples, the third and fourth tubes are disposed on the top of the tire carrier when the tire carrier is mounted to the vehicle.

In some such examples, a first end of the third tube is rotatably coupled to the second tube, a second end of the third tube receives a first end of the fourth tube and a second end of the fourth tube is rotatably coupled to the fifth tube. In other examples, the fourth tube receives the third tube.

When the tire carrier is mounted to the vehicle and the third and fourth tubes are disposed on the top of the tire carrier, in some examples, an end of the second tube is rotatably coupled to the third tube, an end of the first tube is rotatably coupled to the second tube and an end of the fifth tube is rotatably coupled to the fourth tube. In some examples, the first and fifth tubes may be fixed relative to one another.

To enable a tire carried by the example tire carrier to be carried by the vehicle, in some examples, the second tube is structured to be hingably coupled to the vehicle at one or more locations. For example, the second tube may be hingably coupled to the vehicle at one location such as, for example, at the bumper of the vehicle and/or the second tube may be hingably coupled to the vehicle at two locations such as, for example, two locations spaced on a rear and/or side panel of the vehicle.

To prevent the tire carrier from inadvertently lowering, in some examples, the tire carrier includes an example lock carried by the third tube. In some examples, the lock is self-locking and/or is biased toward the locked position to prevent the relative position between the third and fourth tubes from changing. In other words, the lock fixes the third and fourth tubes relative to one another to prevent the tire carrier from inadvertently lowering. In some examples, the lock is implemented by an example pipe clamp that is biased, via one or more springs, to provide a locking force against the fourth tube to prevent the fourth tube from being removed from and/or being drawn out of the third tube.

In some examples, the lock includes a bracket (e.g., a containing and locating bracket) formed on an end of the third tube. In some examples, the bracket includes apertures and/or slots through which a release(s) (e.g., an actuator, tabs) of the lock extends. To enable the lock to be actuated between a locked position and an unlocked position, in some such examples, the release is rotated (e.g., clockwise, counterclockwise) or otherwise moved to reduce an amount of mechanical engagement between the lock and the fourth tube to enable the fourth tube to slide out of the third tube to lower the tire carrier. In some examples, to enable the lock to be leveraged against the fourth tube and/or to enable the lock to mechanically engage the fourth tube, in some examples, the slots are defined on opposite sides of the bracket and sized and/or positioned to cause an engagement member (e.g., plates) of the lock to mechanically engage the fourth tube.

To lower the tire adjuster from the raised position, in some examples, a person moves the release of the lock toward the unlocked position such that the engagement member of the lock provides less locking force on the fourth tube. For example, moving the lock toward the release position rotates the engagement member relative to a longitudinal axis of the fourth tube to position a longitudinal axis of the engagement member closer to being perpendicular with the longitudinal axis of the fourth tube. To enable the tire adjuster to be lowered at a faster rate, in some examples, the release and/or engagement member is structured to be rotated further from the locked position.

To secure the tire adjuster in the raised position, in some examples, an example second lock is provided that prevents the lock from being inadvertently actuated. In some examples, the second lock includes a rotatable tang that ratchets over the engagement member (e.g., the plates) of the lock to secure the tire adjuster in the raised position. For example, the tang may pass through a slot defined by the engagement member of the lock to secure the tire carrier in the raised position and/or to prevent the lock from actuating from the locked position to the unlocked position. To enable the second lock to be released, in some examples, the second lock includes a handle usable to rotate the tang out of the path of the engagement member of the lock.

FIG. 1 illustrates an example vehicle 100 including an example tire carrier 102 on which a tire 104 is mounted. In this example, the tire carrier 102 includes a bracket 106 (more clearly shown in FIGS. 2 and 3) having lugs 108 that are received by bolt holes 110 of a rim 112 to secure the tire 104 to the tire carrier 102.

As shown in the illustrated example, the tire carrier 102 includes a frame 113 including a first tube, leg or elongate member 114, a second tube, leg or elongate member 116 having legs, devises and/or lugs 118, 120 and third and fourth tubes, legs or elongate members 122, 124. To enable the tire carrier 102 to be moved between a stowed or raised position as shown in FIG. 1 and a vehicle access position in which the tire carrier 102 is swung away from the vehicle 100 shown in FIG. 2, in this example, the second leg 116 is hingably coupled to the vehicle 100 via hinges 126, 128.

Figure 3:
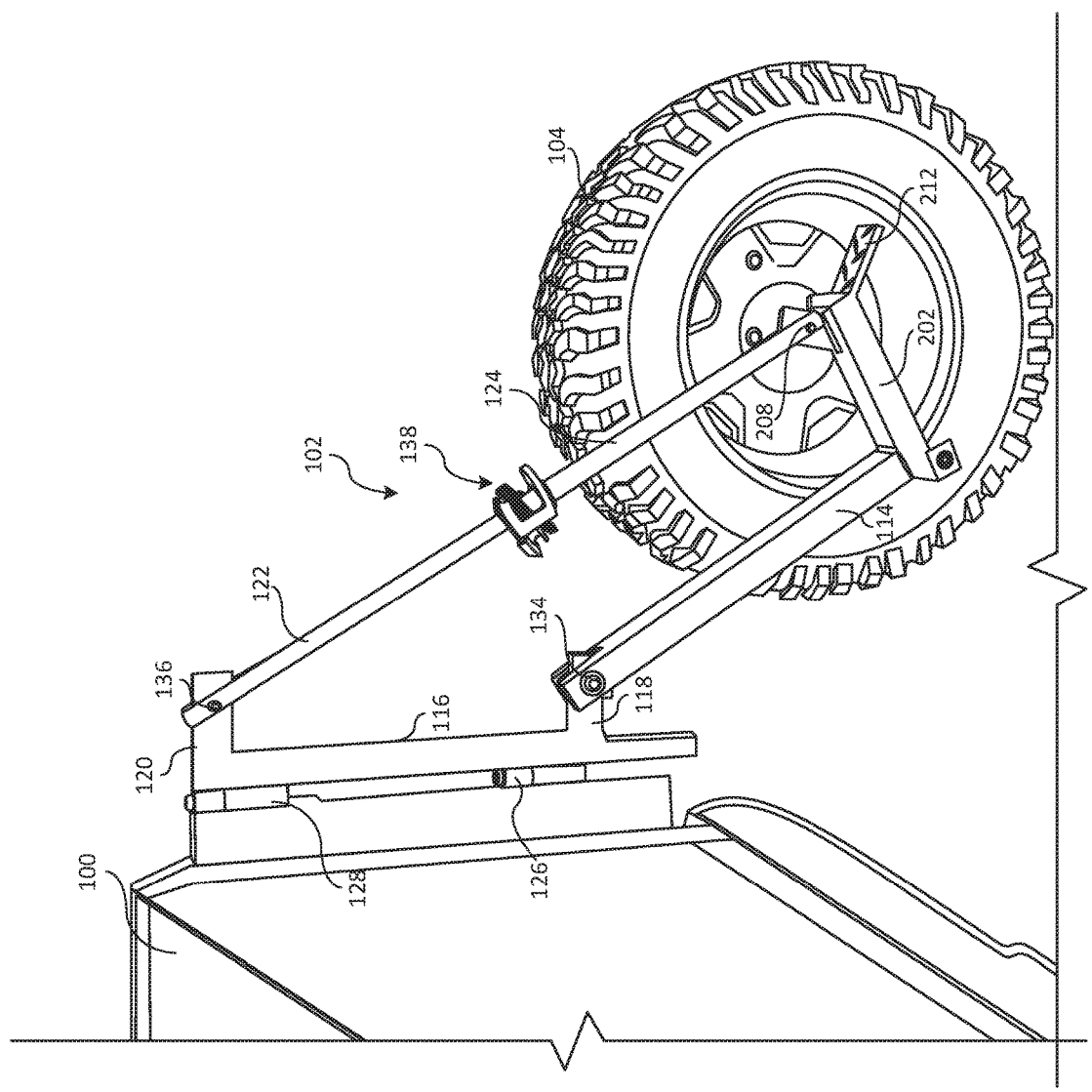
FIG. 3 illustrates the example vehicle of FIG. 1 including the example tire carrier in the lowered position with the distal end of the tire carrier spaced from the vehicle.

To enable the tire carrier 102 to be moved between a raised/contracted position shown in FIG. 1 and a lowered/extended position shown in FIG. 3, in the illustrated example, the first and second legs 114, 116 are rotatably coupled, the second and third legs 116, 122 are rotatably coupled and the third and fourth legs 122, 124 are telescopically coupled. For example, the first and third legs 114, 122 define slots 130, 132 that receive the respective lugs 118, 120 of the second leg 116 and are rotatably coupled to the second leg 116 via fasteners or pins 134, 136. In the illustrated example, to secure the third and fourth legs 122, 124 relative to one another, the tire carrier 102 includes an example lock 138 carried by the fourth tube 124.

In some examples, the example lock 138 enables the third leg 122 to move (e.g., slide) into the fourth leg 124 when the tire carrier 102 is moved into the raised position but prevents the third leg 122 from being drawn out of the fourth leg 124 unless the lock 138 is intentionally actuated and/or moved to a released position. In other words, in some examples, the lock 138 is structured to enable the tire 104 to be lowered to the ground when the lock 138 is actuated or released. Additionally, the lock 138 is structured to enable the relative position between the third and fourth legs 122, 124 to be incrementally secured, via the lock 138, during the raising process without human interaction.

Figure 2:
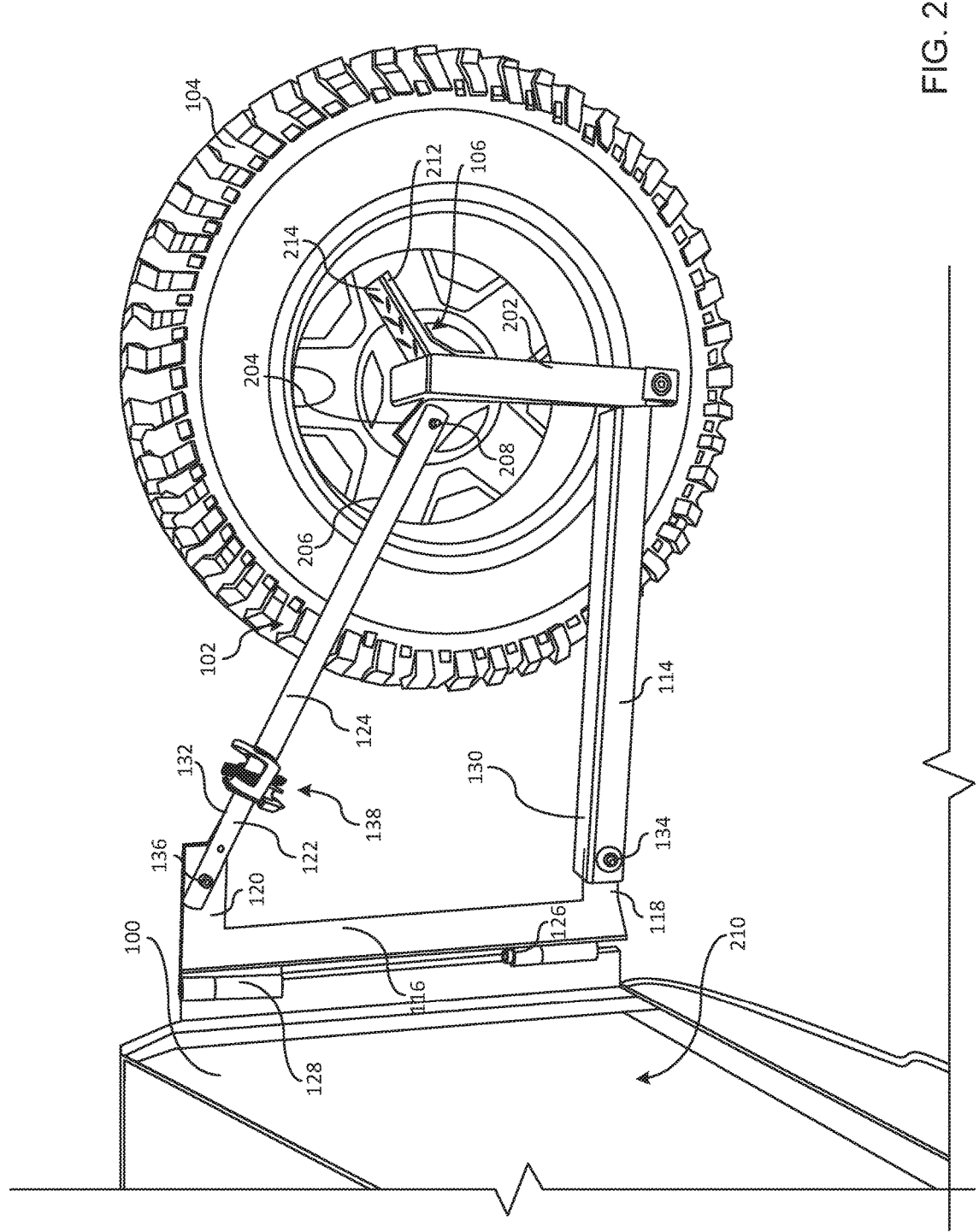
FIG. 2 illustrates the example vehicle of FIG. 1 including the example tire carrier in the raised position with the distal end of the tire carrier spaced from the vehicle.

FIG. 2 illustrates the example tire carrier 102 in a vehicle access position in which the tire 104 is spaced from the vehicle 100 and/or the tire carrier 102 is swung away from the vehicle 100. As shown in the illustrated example, the example tire carrier 102 includes an example fifth tube, leg or elongate member 202 positioned between the first and fourth legs 114, 124. In this example, the first and fifth legs 114, 202 are fixed relative to one another (e.g., welded, bolted, etc.) or are formed of a single piece of material. To rotatably couple the fourth and fifth legs 124, 202, in the illustrated example, an example first clevis or lug 204 extends from the fifth leg 202 and is received by an example slot 206 of the fourth leg 124 and is rotatably coupled via a fastener 208.

To assist a person to enter a rear 210 of the vehicle 100 and/or to access a roof of the vehicle 100, in this example, the tire carrier 102 includes an example second lug 212 to which a plate 214 is coupled. For example, the tire carrier 102 may be structured to position the second lug 212 and the plate 214 to be used as a step when the tire carrier 102 is in the lowered position (e.g., the tire 104 engages the ground). The plate 214 may be implemented by diamond plate or any other material that enables a person to step on the plate 214 without slipping. Additionally, in this example, the second lug 212 is structured to be used as a handle to assist a person with raising and/or lowering the example tire carrier 102.

FIG. 3 illustrates the tire carrier 102 in the lowered position with the tire 104 engaging the ground. When the example tire carrier 102 is in the lowered position, in some examples, the tire carrier 102 is structured to enable a person to sit on the tire 104 during, for example, a social scenario, a camping scenario, a tailgating scenario, etc., or, more generally, a situation in which people are gathering and/or socializing around the vehicle. As shown in the illustrated example, when the example tire carrier 102 is in the lowered position, the tire carrier 102 is structured to be out of a line of sight of a person sitting on the rear 210 of the vehicle 100 during, for example, a social scenario, a camping scenario, a tailgating scenario, etc., or, more generally, a situation in which people are gathering and/or socializing around the vehicle. In some examples, when the tire carrier 102 is in the lowered position, the holes 110 of the rim 112 can be easily aligned with the lugs 108 of the tire carrier 102 to enable a person to position the tire 104 on the tire carrier 102 without having to lift the tire 104 a great distance if at all (e.g., a distance from the ground to a position associated with the tire carrier 102 being in the stowed, raised position).

Figure 4:
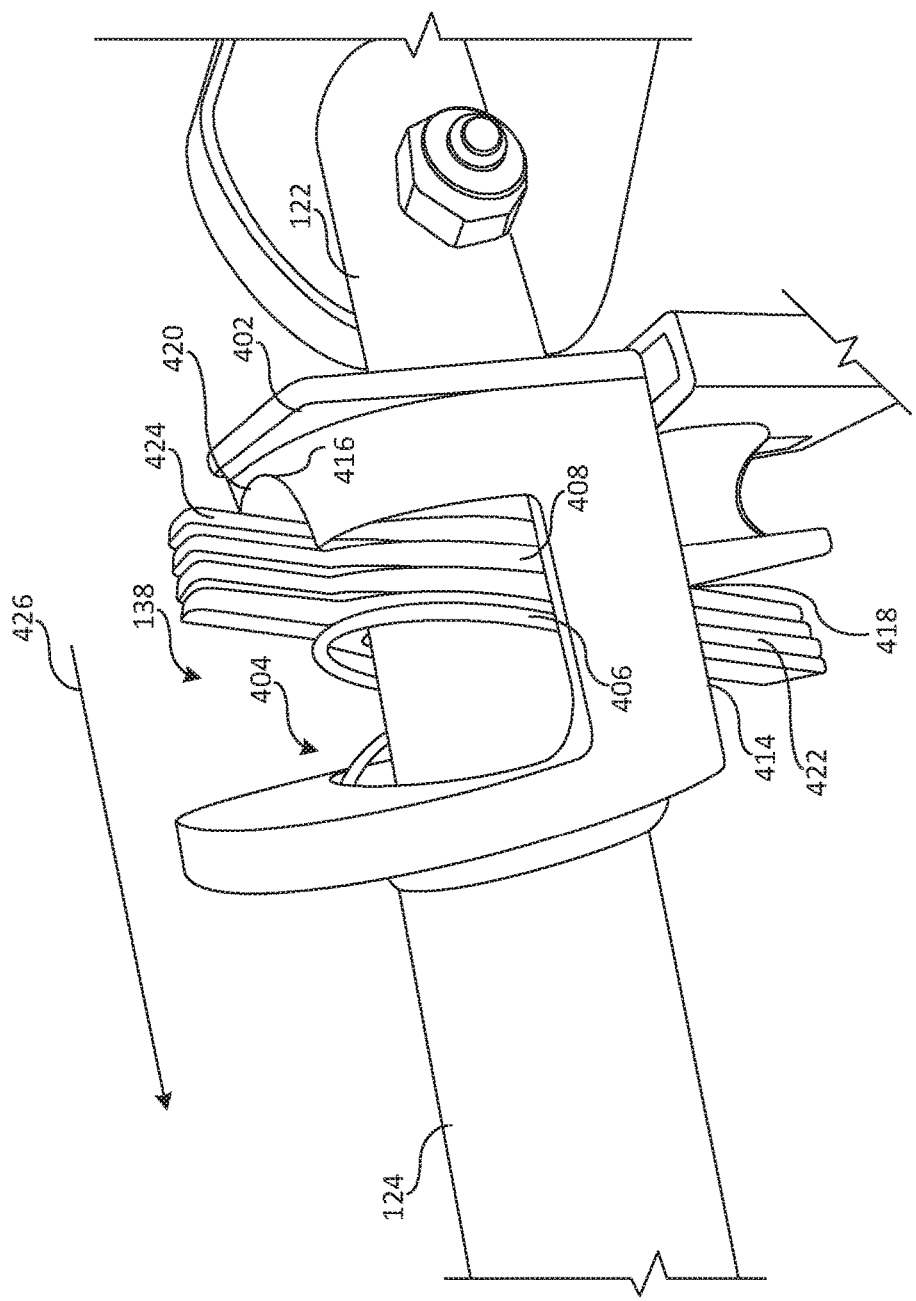
FIG. 4 illustrates a detailed view of an example lock of the example tire carrier of FIG. 1.

FIG. 4 illustrates a detailed view of the example lock 138 of the example tire carrier 102. In the illustrated example, the lock 138 includes a bracket 402 formed at an end of the fourth leg 124. In this example, the bracket 402 includes a cavity 404 in which a biasing element (e.g., a spring) 406 and plates 408 are disposed. To couple the biasing element 406 and the plates 408 within the cavity 404, the third leg 122 extends through the bracket 402 and through apertures formed by the biasing element 406 and the plates 408 such that the biasing element 406 urges the plates 408 toward the locked position (shown in FIG. 4) and the biasing element 406 and the plates 408 surround the third leg 122.

To enable the plates 408 to impart a locking force on the third leg 122, the bracket 402 defines opposing first and second slots 414, 416 that are structured to cause axes of the plates 408 to be non-perpendicular relative to a longitudinal axis of the third leg 122 when the lock 138 is in the locked position. Specifically, based on a first stop or end 418 of the first slot 414 being spaced from a second stop or end 420 of the second slot 416, first tabs 422 of the plates 408 that extend through the first slot 414 engage the first stop 418 prior to second tabs 424 of the plates 408 that extend through the second slot 416 engaging the second stop 420 causing the plates 408 to cock and engage the third leg 122. The engagement between the plates 408 and the third leg 122 prevents the third leg 122 from being removed from the fourth leg 124.

To actuate the lock 138 toward the unlocked position to enable the third leg 122 to slide or telescope relative to the fourth leg 124 and for the tire carrier 102 to lower, in some examples, the second tabs 424 are movable in a direction generally indicated by arrow 426 (e.g., counterclockwise) by a person moving the second tabs 424. Alternatively, to actuate the lock 138 toward the unlocked position, the first tabs 422 are movable in a direction generally opposite the direction generally indicated by the arrow 426. An additional actuator may be carried by the tire carrier 102 enable the lock 138 to be released. For example, the actuator may be implemented by a lever or handle distal to the lock 138 itself. If the tabs 422 and/or 424 are no longer being actuated, in this example, the biasing element 406 automatically urges the plates 408 into the locked position in which the plates 408 mechanically engage against the third leg 122 to prevent the tire carrier 102 from inadvertently lowering.

To actuate the lock 138 toward the unlocked position to enable the third leg 122 to be pushed into the fourth leg 124 and for the tire carrier 102 to raise, in some examples, the movement of the third leg 122 into the fourth leg 124 urges the second tabs 424 in the direction generally indicated by the arrow 426 against the biasing force of the biasing element 406. Thus, in some examples, the lock 138 is structured to automatically release to the unlocked position when the third leg 122 is being moved into the fourth leg 124 to raise the tire carrier 102.

Figure 5A:
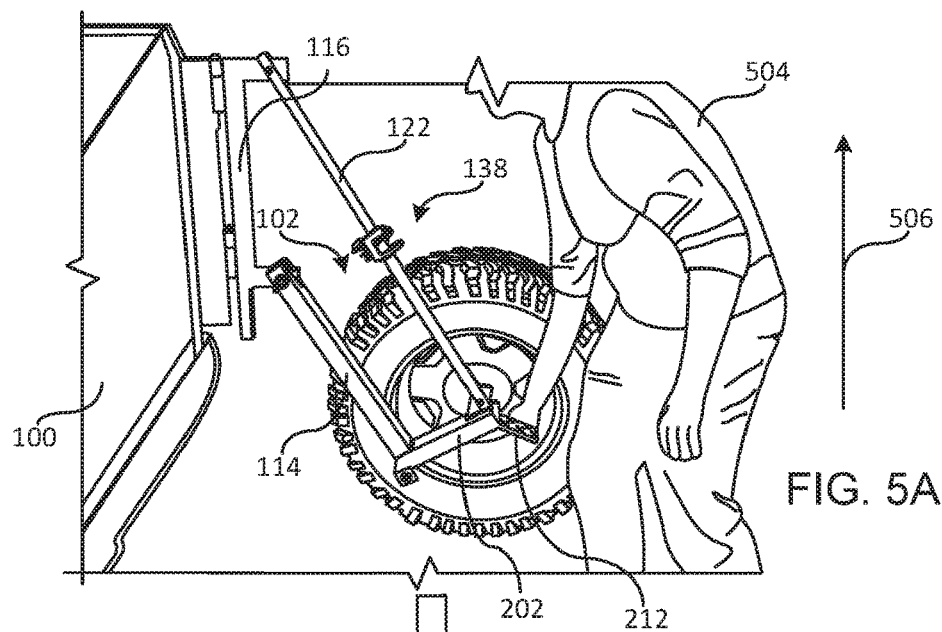
FIGS. 5A-5C illustrate a series of views depicting an example process of moving the example tire carrier of FIG. 1 from the lowered position to the raised position.
Figure 5B:
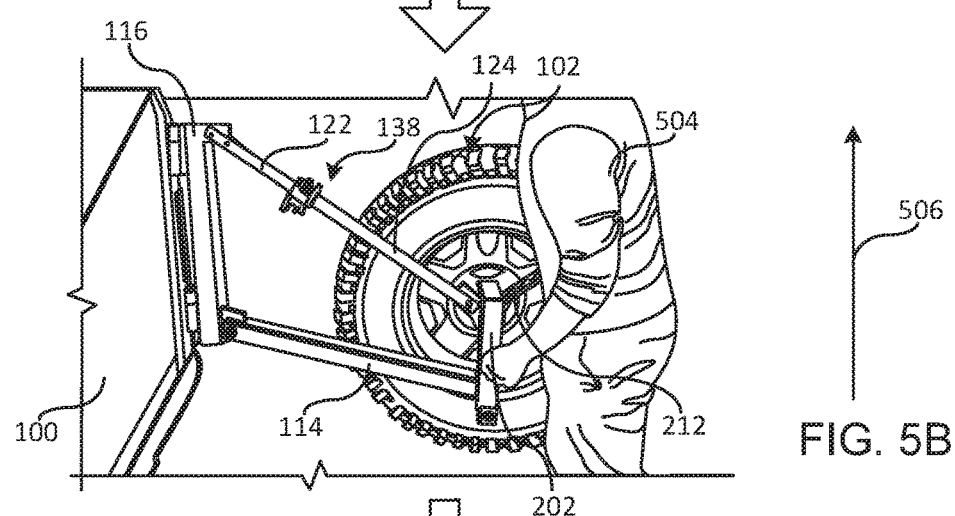
Figure 5C:
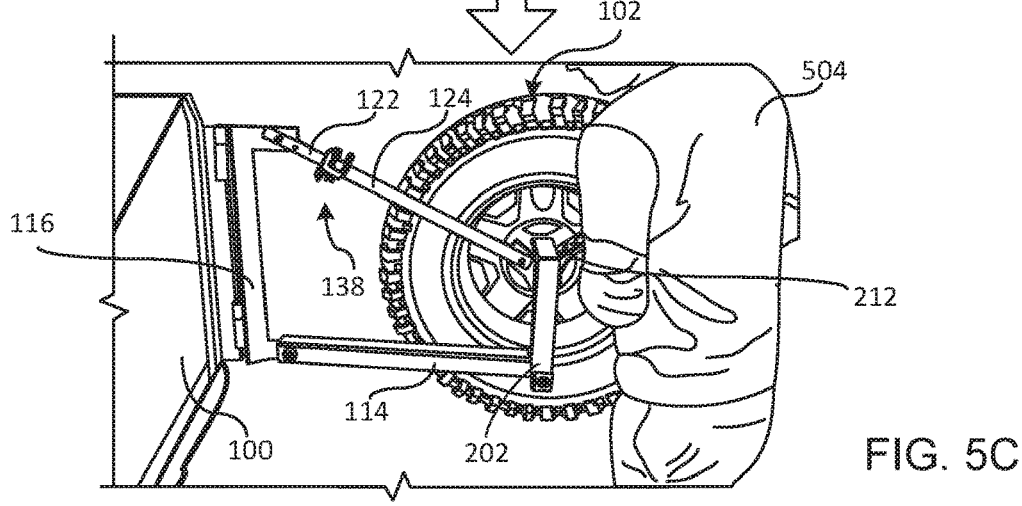

FIGS. 5A-5C illustrate an example process of raising the example tire carrier 102 from the lowered position, to a mid-travel position to a raised position. As shown in FIG. 5A, a person 504 is shown gripping the second lug 212 and exerting a force in a direction generally indicated by arrow 506 to raise the tire carrier 102. FIG. 5B illustrates the example tire carrier 102 at a mid-travel position and the lock 138 self-locking to prevent the tire carrier 102 from lowering even if the person 504 is not applying the force in the direction generally indicated by the arrow 506. By structuring the lock 138 to be self-locking, the person 504 can change positions as the tire carrier 102 is being raised without the tire carrier 102 inadvertently lowering. FIG. 5C illustrates the tire carrier 102 in the raised position and the lock 138 self-locking to prevent the tire carrier 102 from lowering.

Figure 6A:
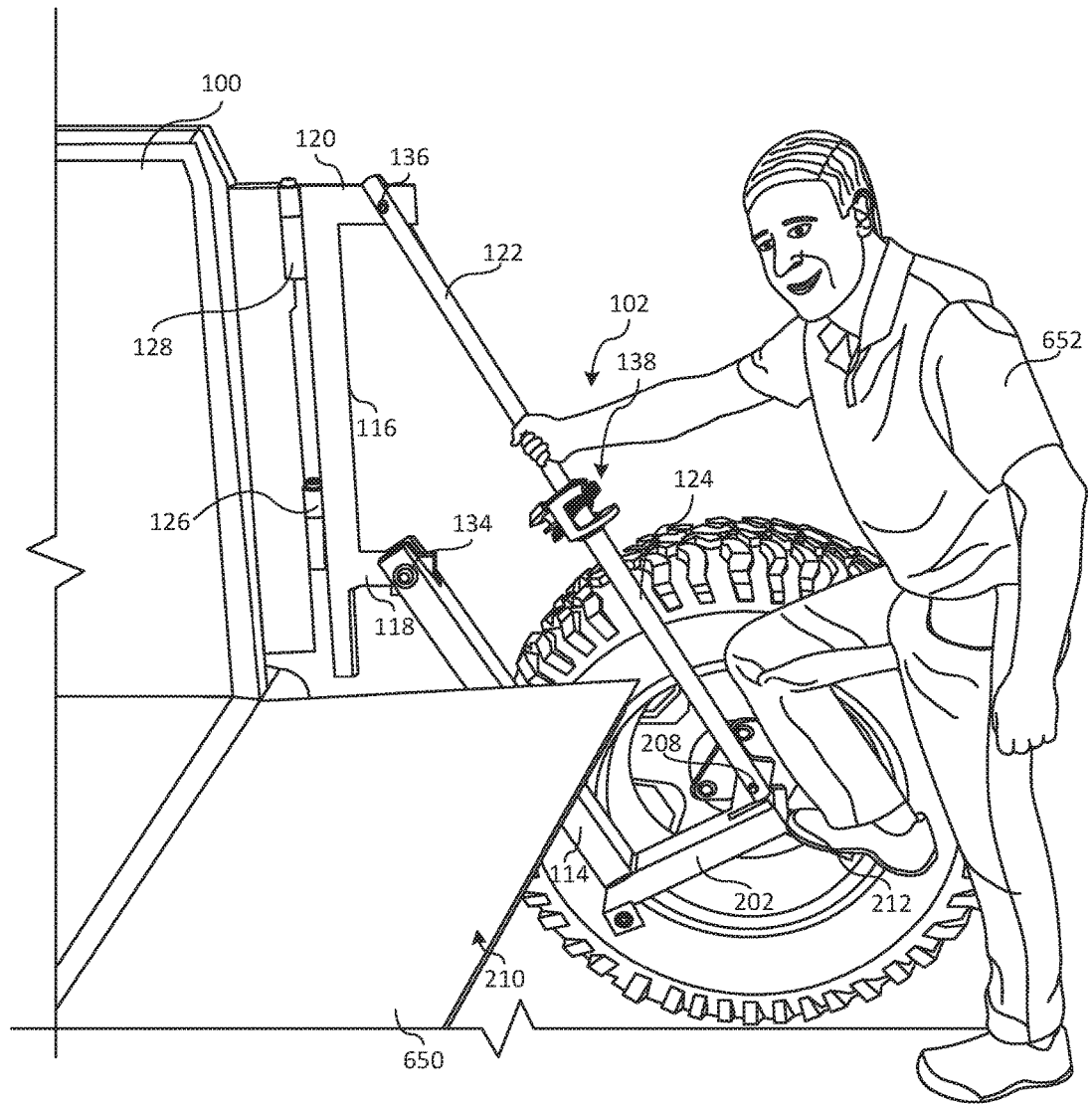
FIGS. 6A and 6B illustrate an person using an example step of the example tire carrier to access a rear of the vehicle.
Figure 6B:
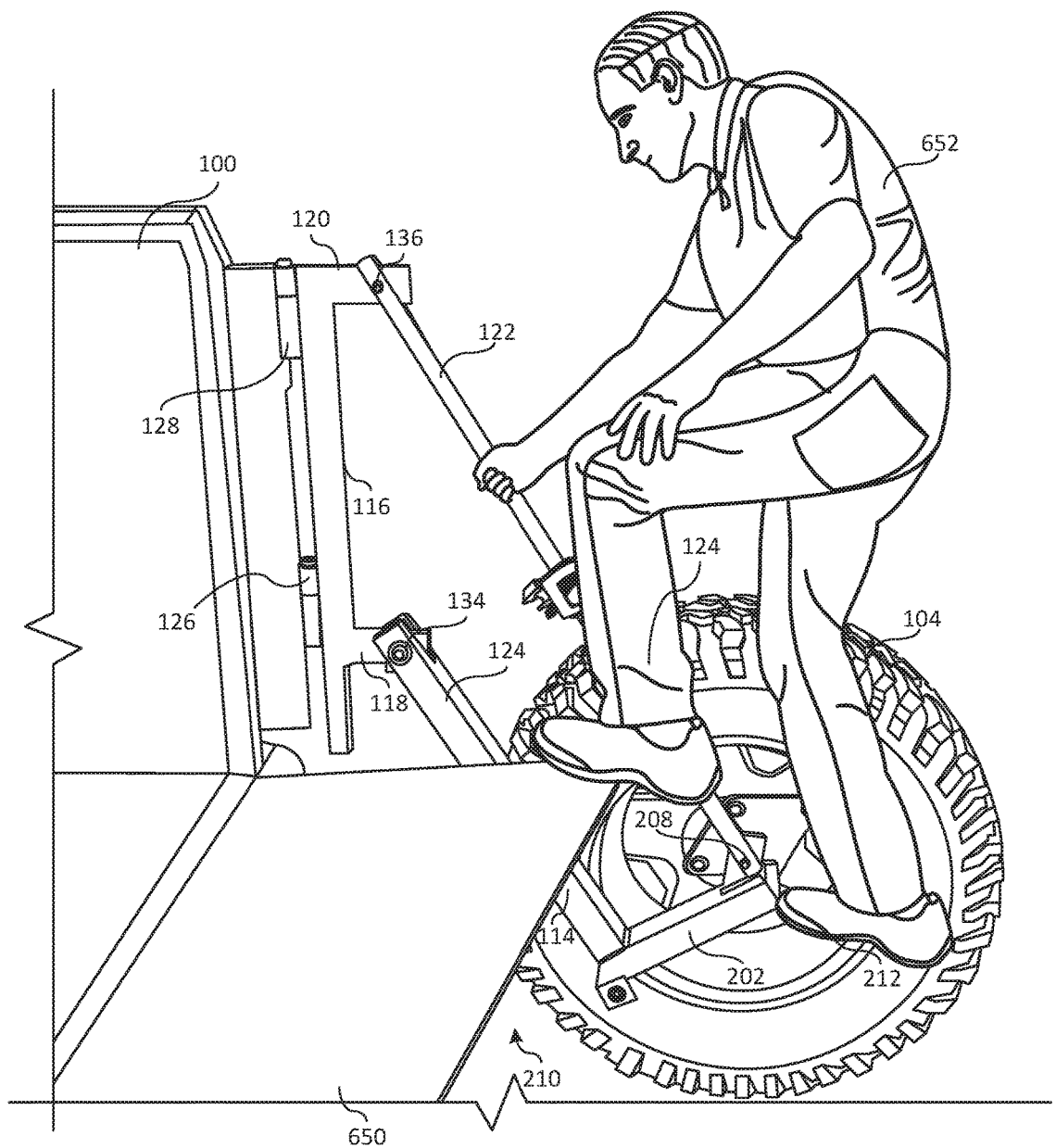

FIGS. 6A and 6B illustrate an example process of using the example second lug 212 to enter the rear 210 of the vehicle 100 with an example tailgate 650 in a lowered position. As shown in FIG. 6A, a person 652 is holding the third leg 122 of the example tire carrier 102 with one hand and stepping on the second lug 212 and FIG. 6B illustrates the person 652 stepping onto the tailgate 550 from the second lug 212.

Figure 7:
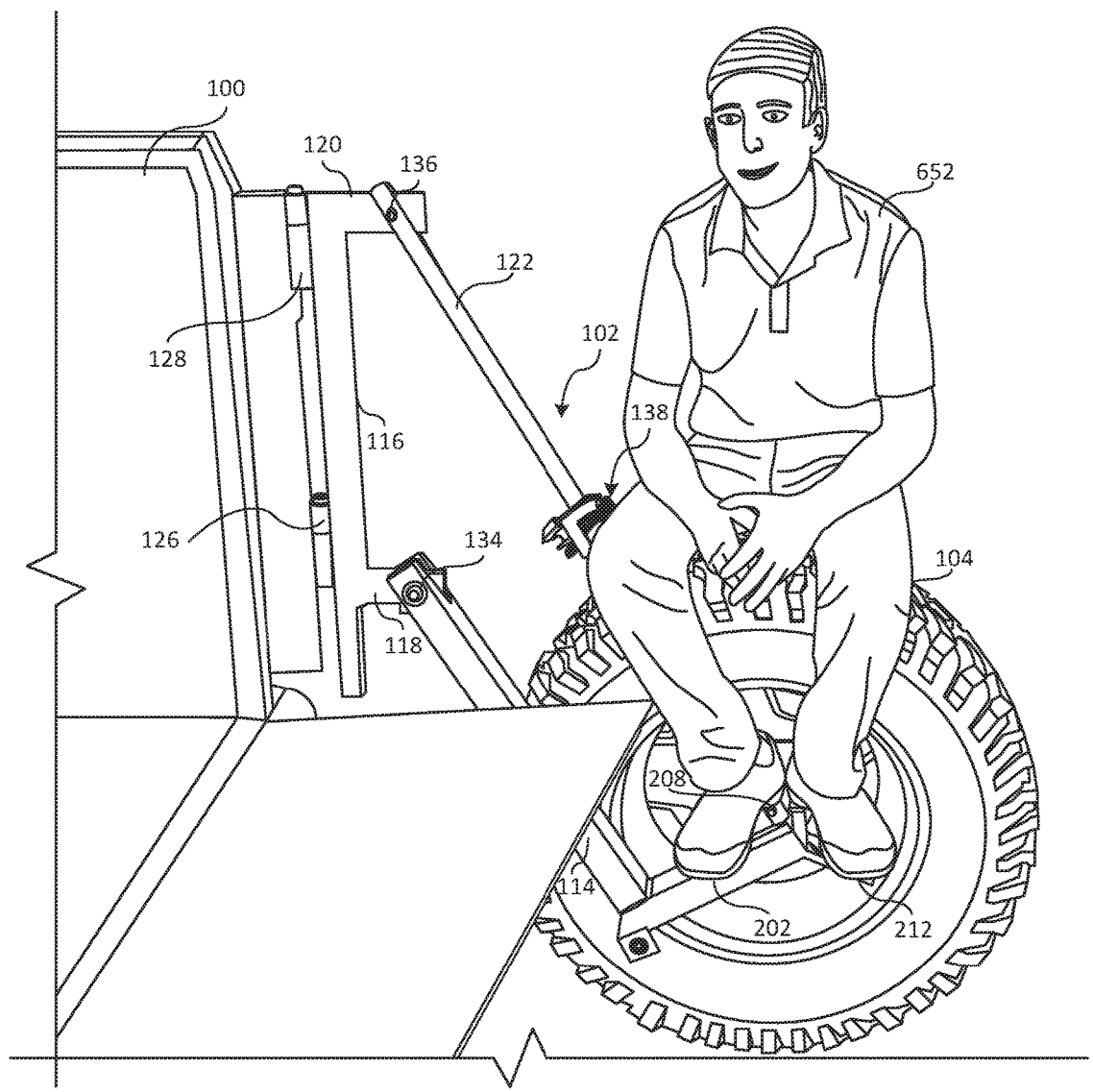
FIG. 7 illustrates a person sitting on the tire of the example tire carrier when the tire carrier is in the lowered position.

FIG. 7 illustrates the person 652 sitting on the tire 104 with the tire carrier 102 in the lowered position during, for example, a social scenario, a camping scenario, a tailgating scenario, etc., or, more generally, a situation in which people are gathering and/or socializing around the vehicle 100.

Figure 8:
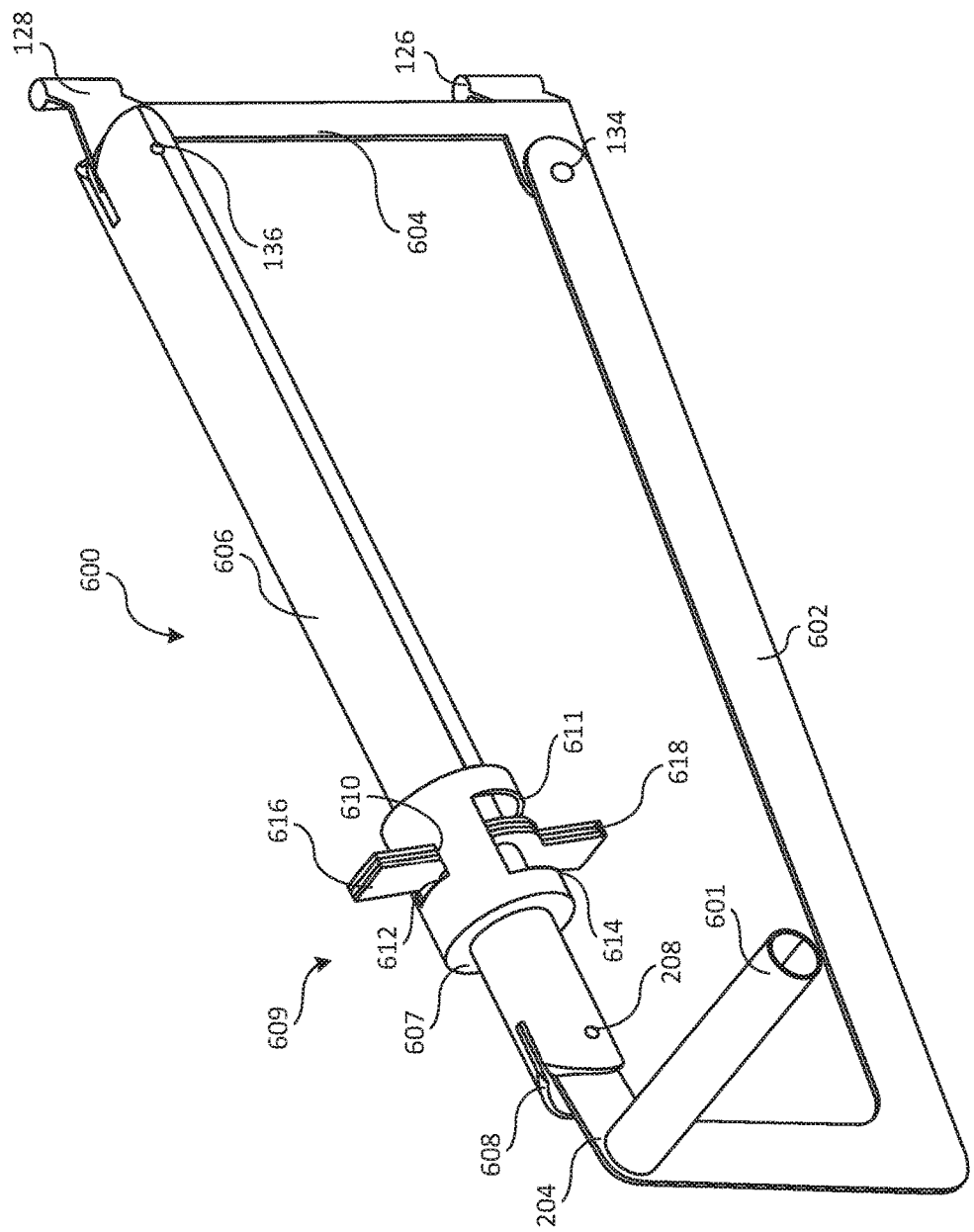
FIG. 8 illustrates an isometric view of an example tire carrier in a raised position that can be used to implement the teachings of this disclosure.

FIG. 8 illustrates an example tire carrier 600 that is similar to the tire carrier 102 of FIG. 1. In contrast to the example tire carrier 102 of FIG. 1, the tire carrier 600 does not include the bracket 106 mounted on a lug 601 to which the tire 104 is to be mounted. Additionally, in contrast to the tire carrier 102 of FIG. 1, the tire carrier 600 of FIG. 8 includes example first and second legs 602, 604 formed of sheet metal and/or metal stock and example third and fourth tubes, legs or elongate members 606, 608 where the third leg 606 receives the fourth leg 608 instead of the fourth leg 124 receiving the third leg 122 as shown in FIG. 1.

In the illustrated example, the tire carrier 600 includes an example lock 609 on an end 607 of the third leg 606 that is similar to the lock 138 of FIG. 1. In contrast to the lock 138 of FIG. 1, the lock 609 of FIG. 8 includes first and second slots 610, 611 having first and second stops and/or ends 612, 614 where the second stop 614 is closer to the end 607 than the first stop 612. Based on the positioning of the first and second stops 612, 614, in some examples, first tabs 616 of the lock 609 are urged into engagement with the first stop 612 prior to second tabs 618 of the lock 609 being urged into engagement with the second stop 614. In some examples, the engagement between the tabs 616, 618 and the stops 612, 614 cause the lock 609 to cock into engagement with the fourth leg 608 and prevent the fourth leg 608 from being pulled out of the third leg 606.

Figure 9:
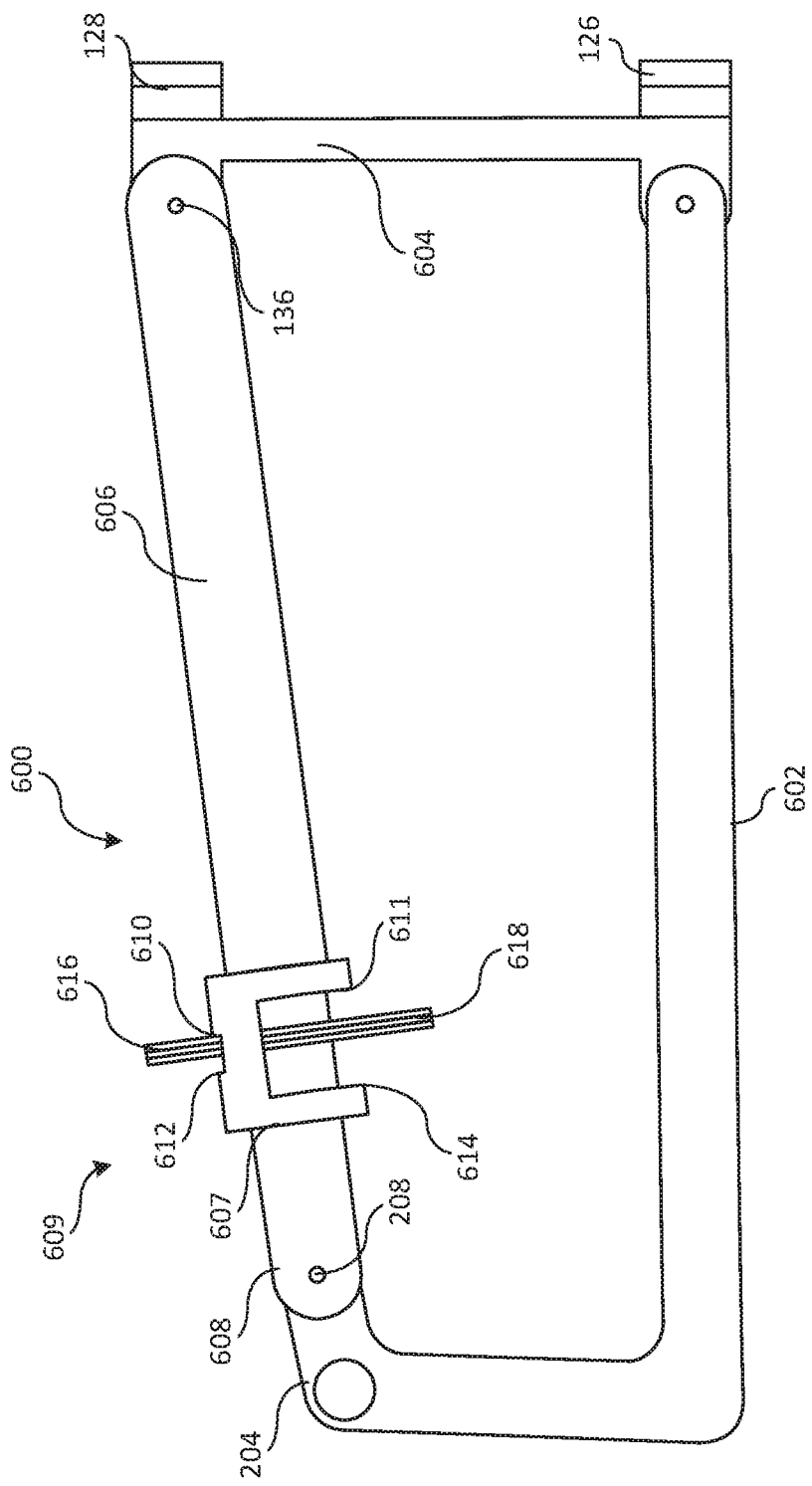
FIG. 9 illustrates a front view of the example tire carrier of FIG. 8.

FIG. 9 illustrates a front view of the example tire carrier 600 of FIG. 8 in the raised position. As shown in the example of FIG. 9, the first stop 612 is spaced further from the end 607 than the second stop 614. Further, as shown in the example of FIG. 9, the first slot 610 is smaller than the second slot 611 to cause the tabs 616, 618 to be offset relative to a longitudinal axis of the third leg 606 when the lock 609 is in the locked position.

Figure 10:
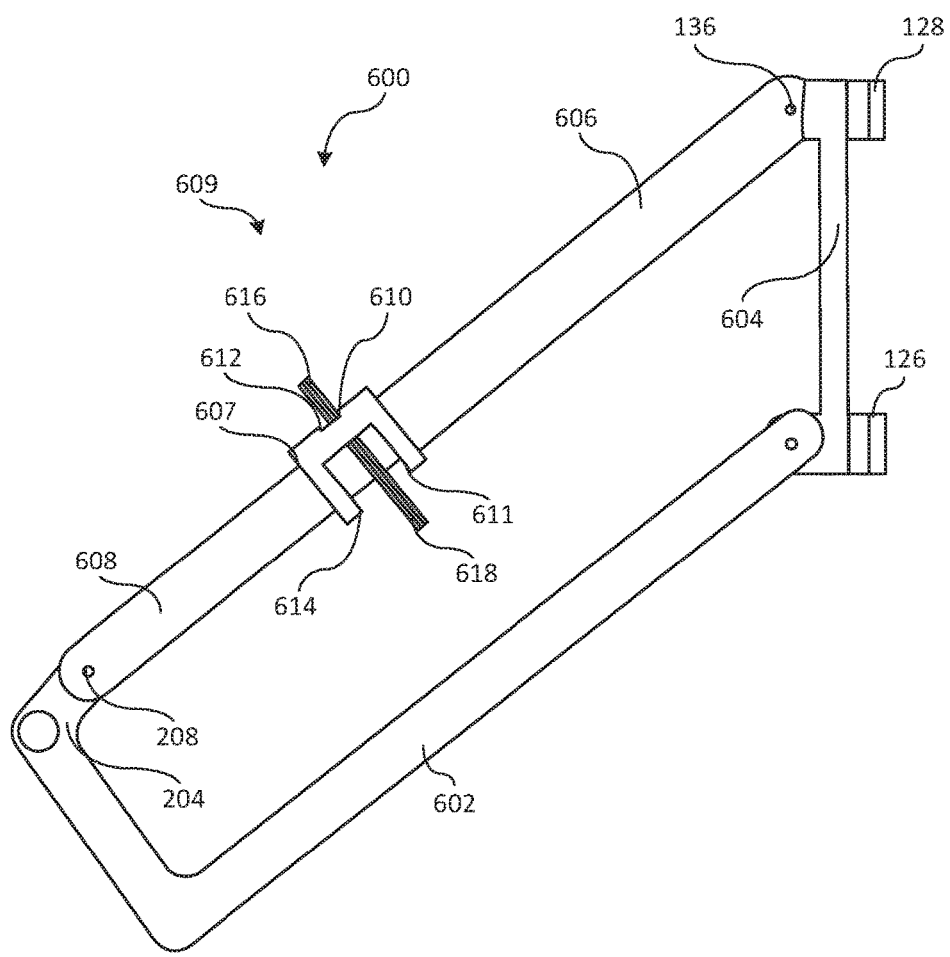
FIG. 10 illustrates a front view of the example tire carrier of FIG. 8 in the lowered position.

FIG. 10 illustrates a front view of the example tire carrier 600 of FIG. 8 in the lowered position. As shown in the example of FIG. 10, the fourth leg 608 is further extending out of the third leg 606 to enable the tire carrier 610 to be in the lowered position.

Figure 11:
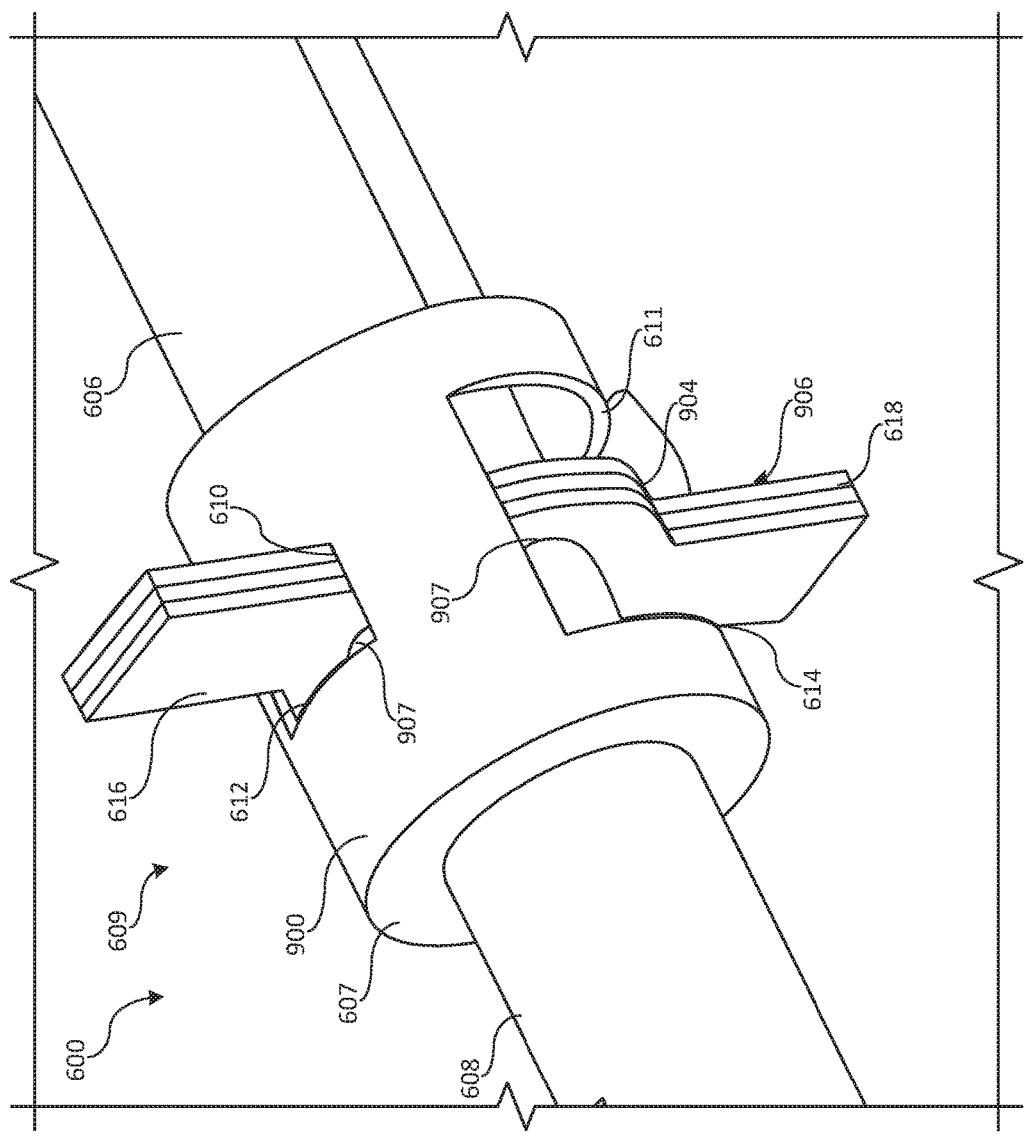
FIG. 11 illustrates a detailed view of an example lock of the tire carrier of FIG. 8.

FIG. 11 illustrates a detailed view of the example lock 609 of the example tire carrier 600 formed of an example bracket 900 in which portions 904 of plates 906 are disposed. To enable the third leg 608 to extend through the plates 906, the plates 906 define apertures 907. As shown in this example, the tabs 616, 618 extend from opposing sides of the portions 904 and through the slots 610, 611 defined by the bracket 900. While this example illustrates the first slot 610 being smaller than the second slot 611, in other examples, the first slot 610 may be larger than the second slot 611.

Figure 12:
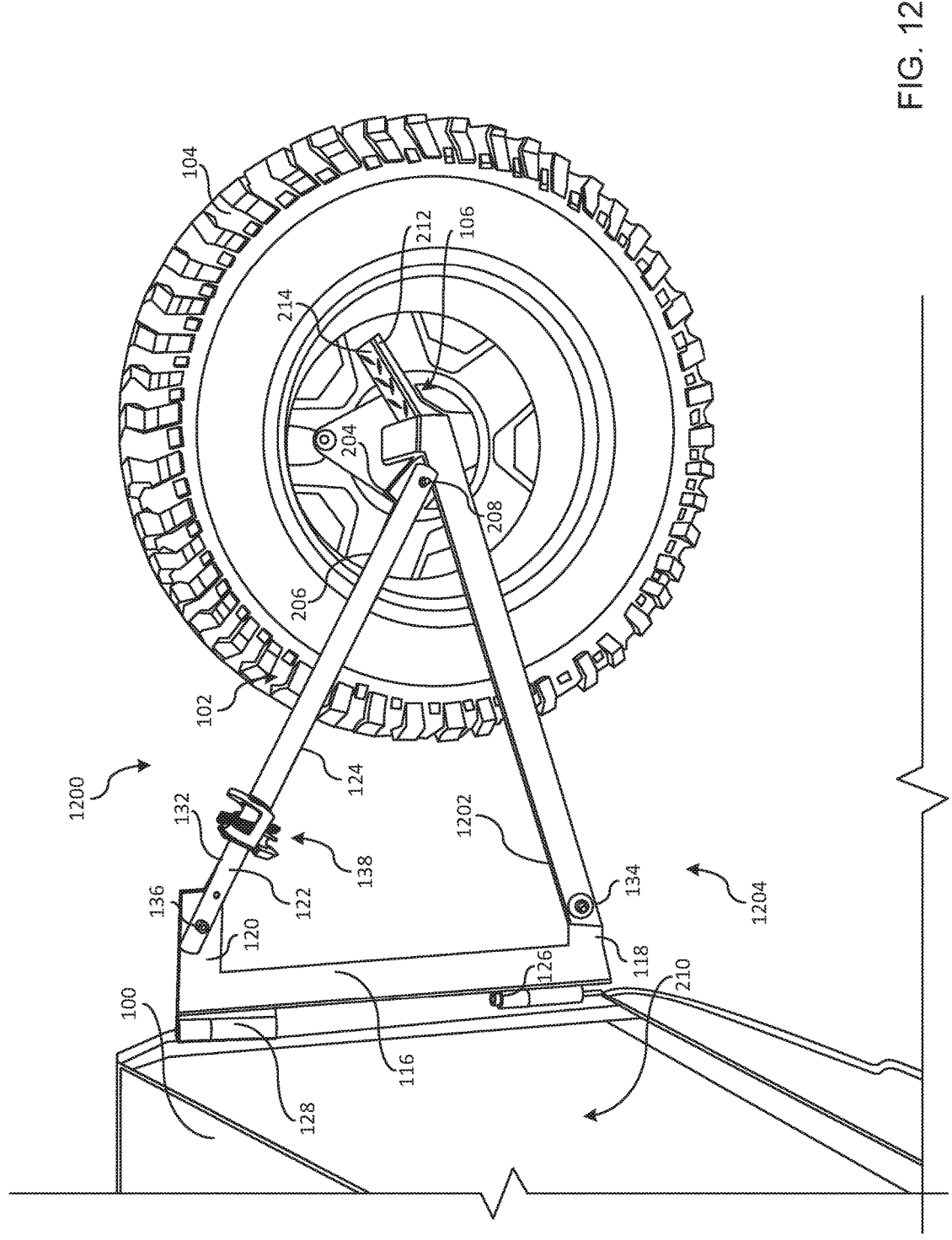
FIG. 12 illustrates an isometric view of another example tire carrier in the raised position.

FIG. 12 illustrates an example tire carrier 1200 that is similar to the tire carrier 102 of FIG. 1. However, in contrast to the tire carrier 102 of FIG. 1, the tire carrier 1200 includes a first leg 1202 including the first lug 204 and the second lug 212. Thus, an example frame 1204 has a relatively triangular cross-section as compared to the frame 113 of the tire carrier 102 of FIG. 1. In other words, the tire carrier 600 does not include a leg having a significant L-shaped cross-section.

Figure 13:
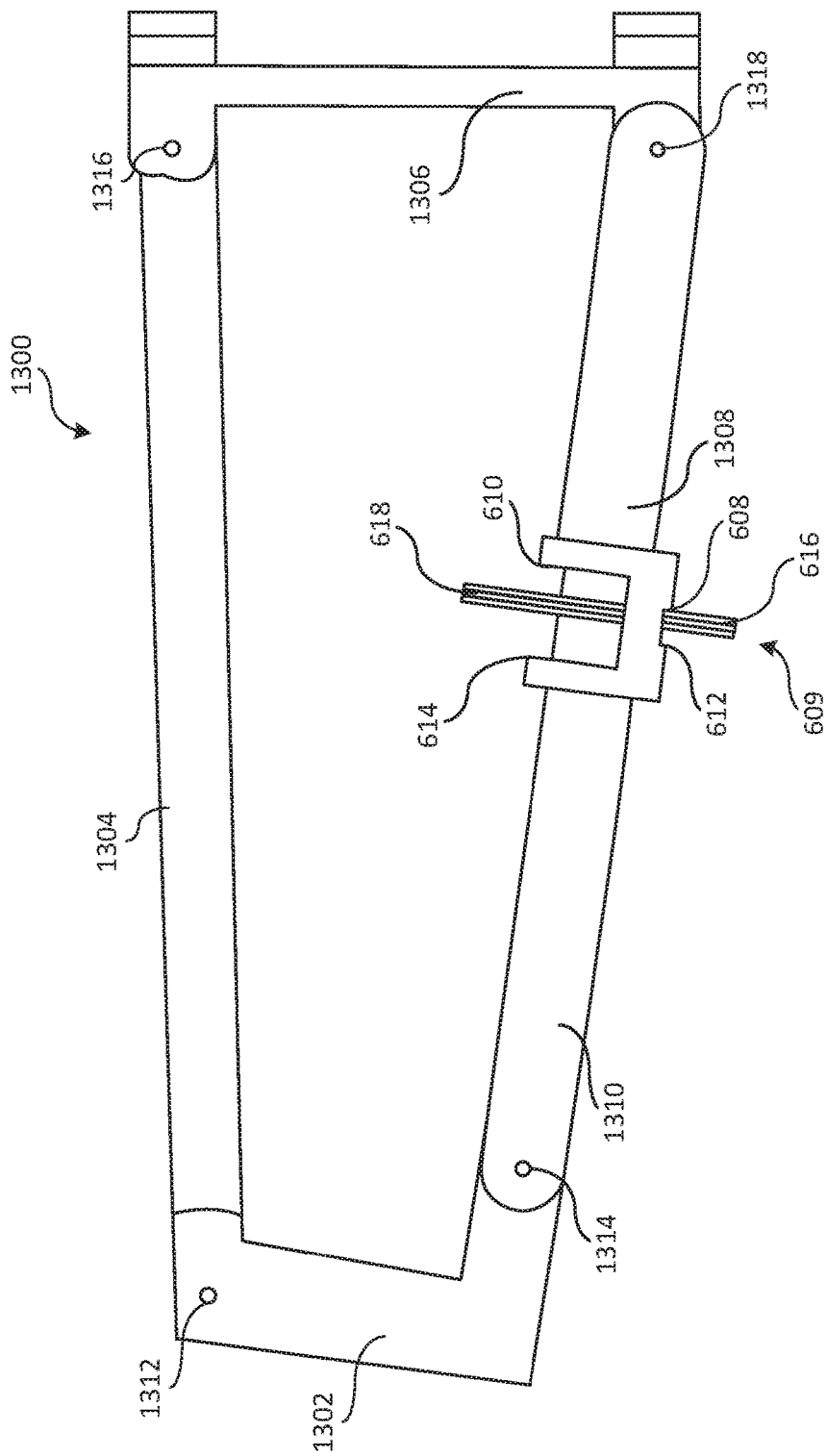
FIG. 13 illustrates a front view of another example tire carrier including telescopically coupled tubes disposed on a bottom of the tire carrier when the tire carrier is mounted to a vehicle.

FIG. 13 illustrates an example tire carrier 1300 that is similar to the tire carrier 600 of FIG. 8. However, in contrast to the tire carrier of FIG. 8, the example tire carrier 1300 includes a first leg 1302, a second leg 1304 and a third leg 1306 that are non-telescoping and fourth and fifth legs, tubes or elongate members 1308, 1310 that are telescopically coupled. In this example, the fourth and fifth legs 1308, 1310 are disposed on the bottom of the tire carrier 1300 when the tire carrier 1300 is mounted to a vehicle.

In the illustrated example, the first leg 1302 is rotatably coupled to the second leg 1304 via a fastener 1312, the first leg 1302 is rotatably coupled to the fifth leg 1310 via a fastener 1314, the second leg 1304 is rotatably coupled to the third leg 1306 via a fastener 1316 and the third leg 1306 is rotatably coupled to the fourth leg 1308 via a fastener 1318. In some examples, the legs 1308, 1310 are positioned and/or sized to be in a contracted position when the tire carrier 1300 is in the raised position and to be in an extended position when the tire carrier 1300 is in the lowered position. In some examples, the legs 1308, 1310 are positioned and/or sized to be in an expanded position when the tire carrier 1300 is in the raised position and to be in a contracted position when the tire carrier 1300 is in the lowered position.

Figure 14:
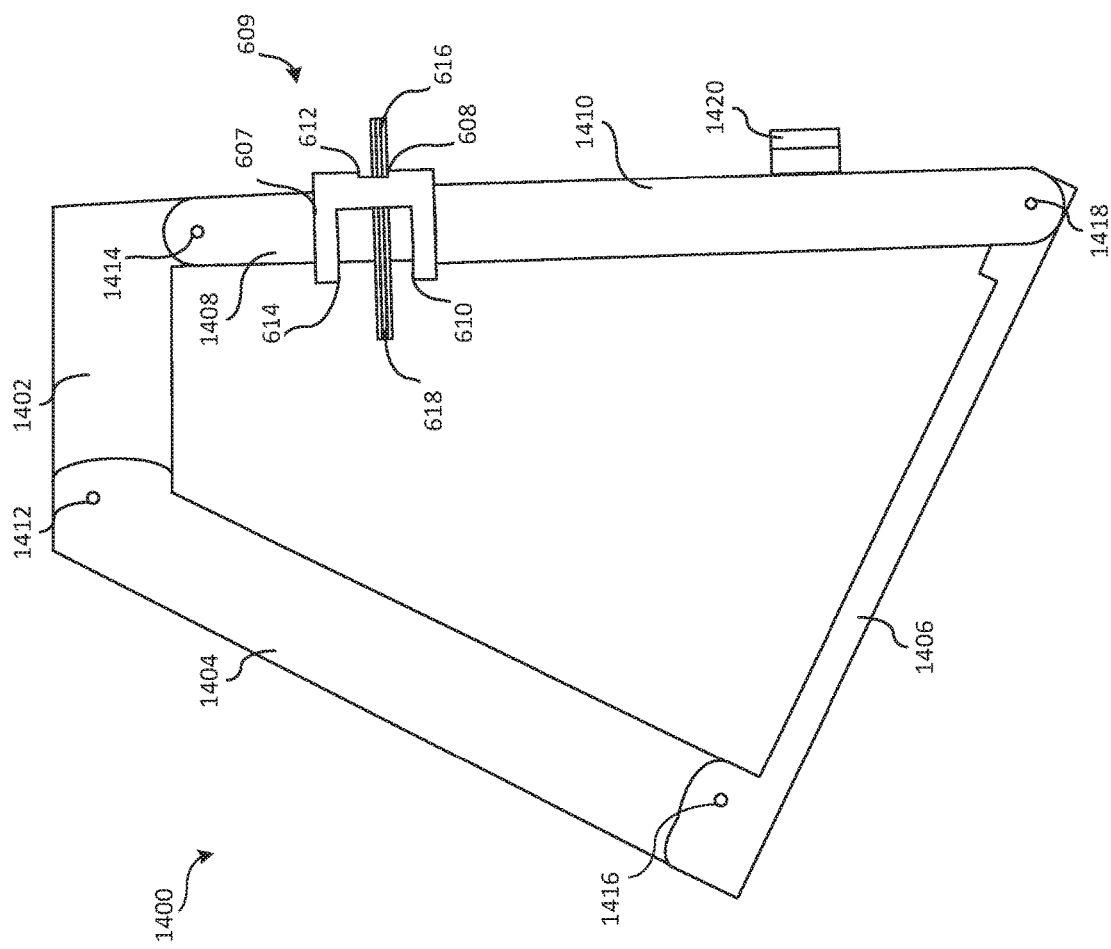
FIG. 14 illustrates a front view of another example tire carrier including telescopically coupled tubes disposed on a side of the tire carrier when the tire carrier is mounted to a vehicle.

FIG. 14 illustrates an example tire carrier 1400 that is similar to the tire carrier 600 of FIG. 8. However, in contrast to the tire carrier of FIG. 8, the tire carrier 1400 includes a first leg 1402, a second leg 1404 and a third leg 1406 that are non-telescoping and fourth and fifth legs, tubes or elongate members 1408, 1410 that are telescopically coupled. In this example, the fourth and fifth legs 1408, 1410 are disposed on the side of the tire carrier 1400 when the tire carrier 1400 is mounted to a vehicle.

In the illustrated example, the first leg 1402 is rotatably coupled to the second leg 1404 via a fastener 1412, the first leg 1402 is rotatably coupled to the fourth leg 1408 via a fastener 1414, the second leg 1404 is rotatably coupled to the third leg 1406 via a fastener 1416 and the third leg 1406 is rotatably coupled to the fifth leg 1410 via a fastener 1418. In some examples, a mount to carry a tire is coupled to the first leg 1402, the third leg 1406 and/or adjacent the coupling of the first leg 1402 and the third leg 1406.

In some examples, the legs 1408, 1410 are positioned and/or sized to be in a contracted position when the tire carrier 1400 is in the raised position and to be in an extended position when the tire carrier 1400 is in the lowered position. In some examples, the legs 1408, 1410 are positioned and/or sized to be in an expanded position when the tire carrier 1400 is in the raised position and to be in a contracted position when the tire carrier 1300 is in the lowered position. In the illustrated example, a hinge 1420 is coupled to the fifth leg 1410 to hingably couple the tire carrier 1400 to a vehicle. Thus, in this example, the fourth leg 1408 moves relative to the hinge 1420. However, in other examples, the hinge 1420 is coupled to the fourth leg 1408 to hingably couple the tire carrier 1400 to the vehicle.

Figure 15:
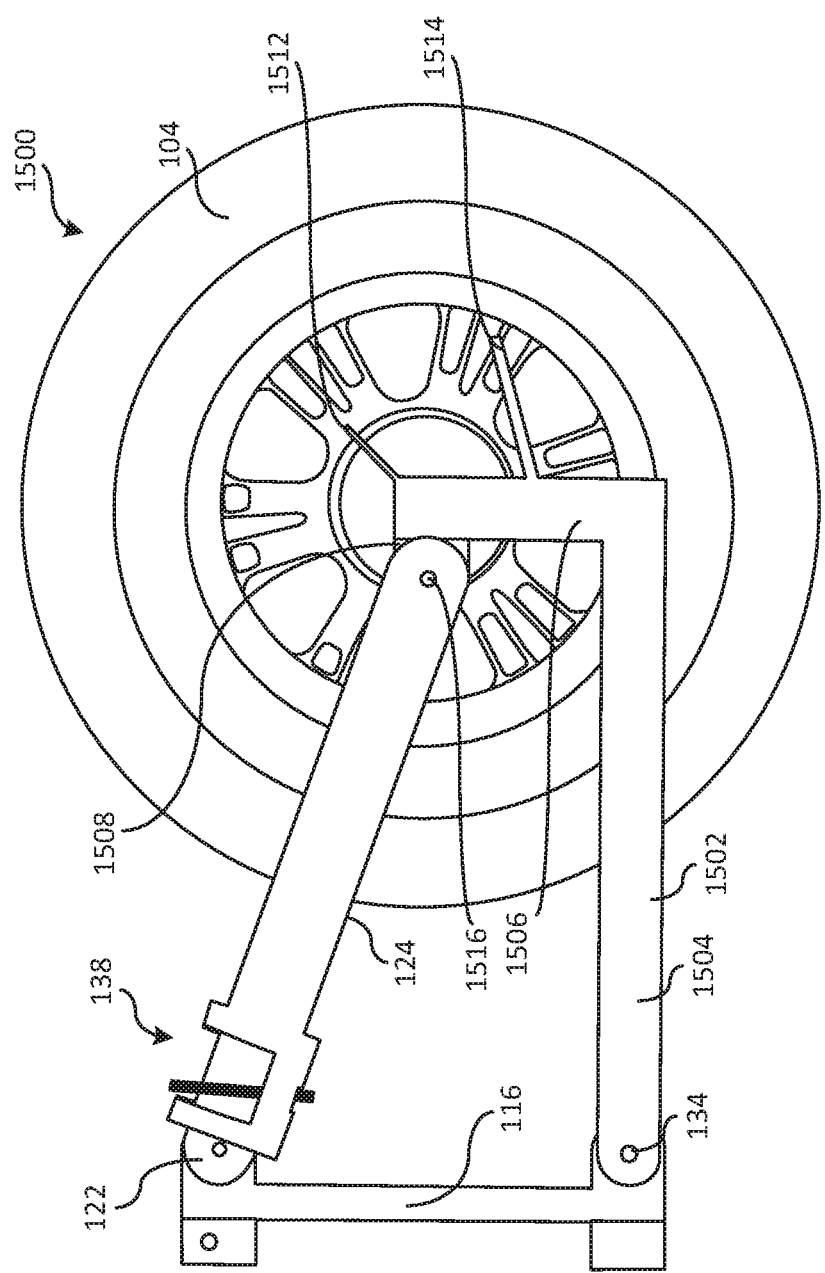
FIG. 15 illustrates a front view of another example tire carrier including an example handle and an example step.

FIG. 15 illustrates an example tire carrier 1500 that is similar to the tire carrier 102 of FIG. 1. In contrast to the example tire carrier 102 of FIG. 1, the tire carrier 1500 includes an example first leg, tube or elongate member 1502 including an example first leg-portion 1504 and an example second leg portion 1506. The second leg portion 1506 includes an example first lug 1508, an example second lug 1512 and an example third lug 1514. In some examples, the first lug 1508 is structured to be hingably coupled to the fourth leg 124 via a fastener 1516, the second lug 1512 is structured to be used as a step when the tire carrier 1500 is in the lowered position and the third lug 1514 is structured to be used as a handle to assist with moving the tire carrier 1500 between the lowered position and the raised position and/or between the raised position and the lowered position.

Figure 16:
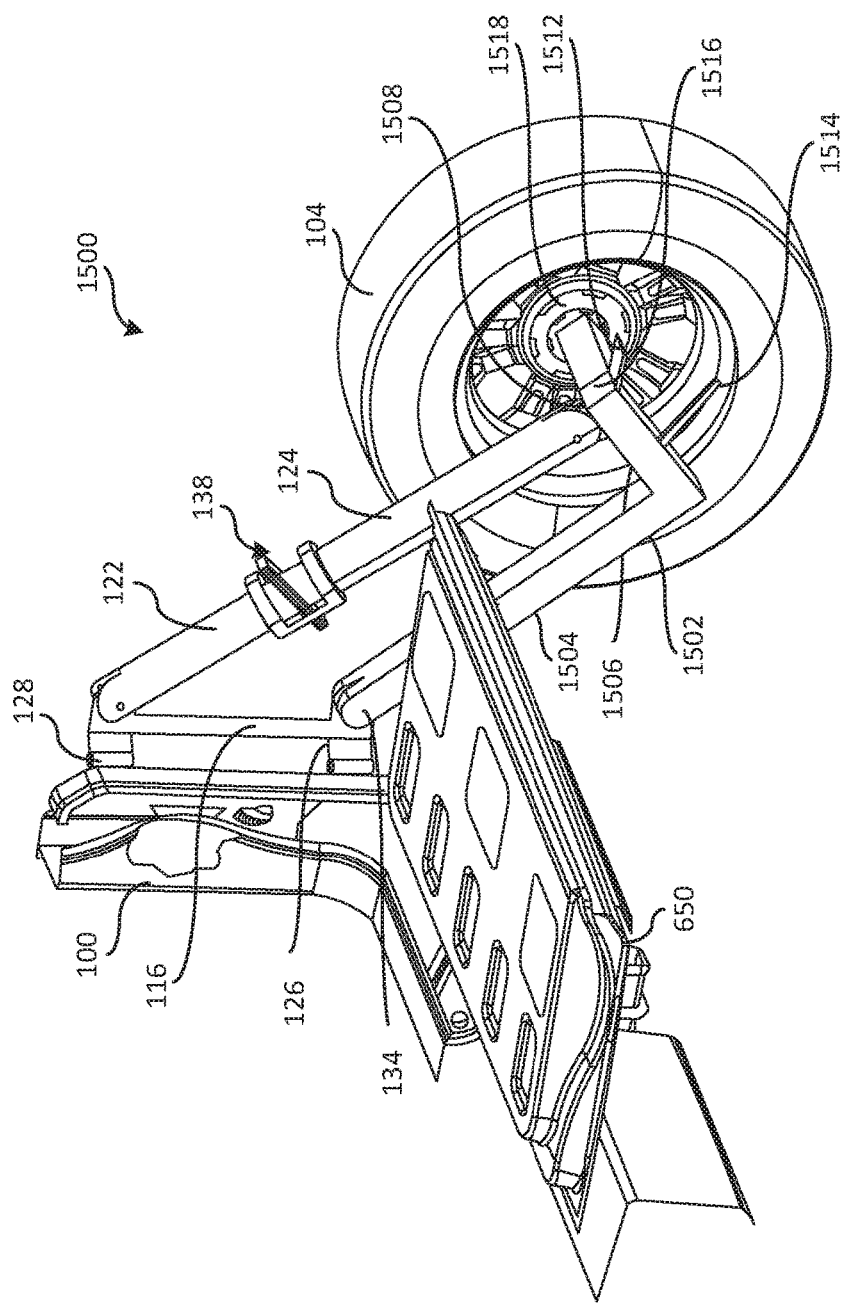
FIG. 16 illustrates an isometric view of the example tire carrier of FIG. 15 in a lowered position.

FIG. 16 illustrates the example tire carrier 1500 in the lowered position with the tire 104 engaging the ground. In the illustrated example, when the tire carrier 1500 is in the lowered position, the second lug 1512 is structured to be used as a step to assist a person stepping from the ground to the tailgate 650 and the third lug 1514 is structured to be used as a handle to assist in moving the tire carrier 1500 between the lowered position and the raised position. In the illustrated example, an example fifth leg or tube 1516 extends from an end of the second leg portion 1506 and includes an example mount 1518 having lugs 1702 (FIG. 17) to which the tire 104 is mounted.

Figure 17:
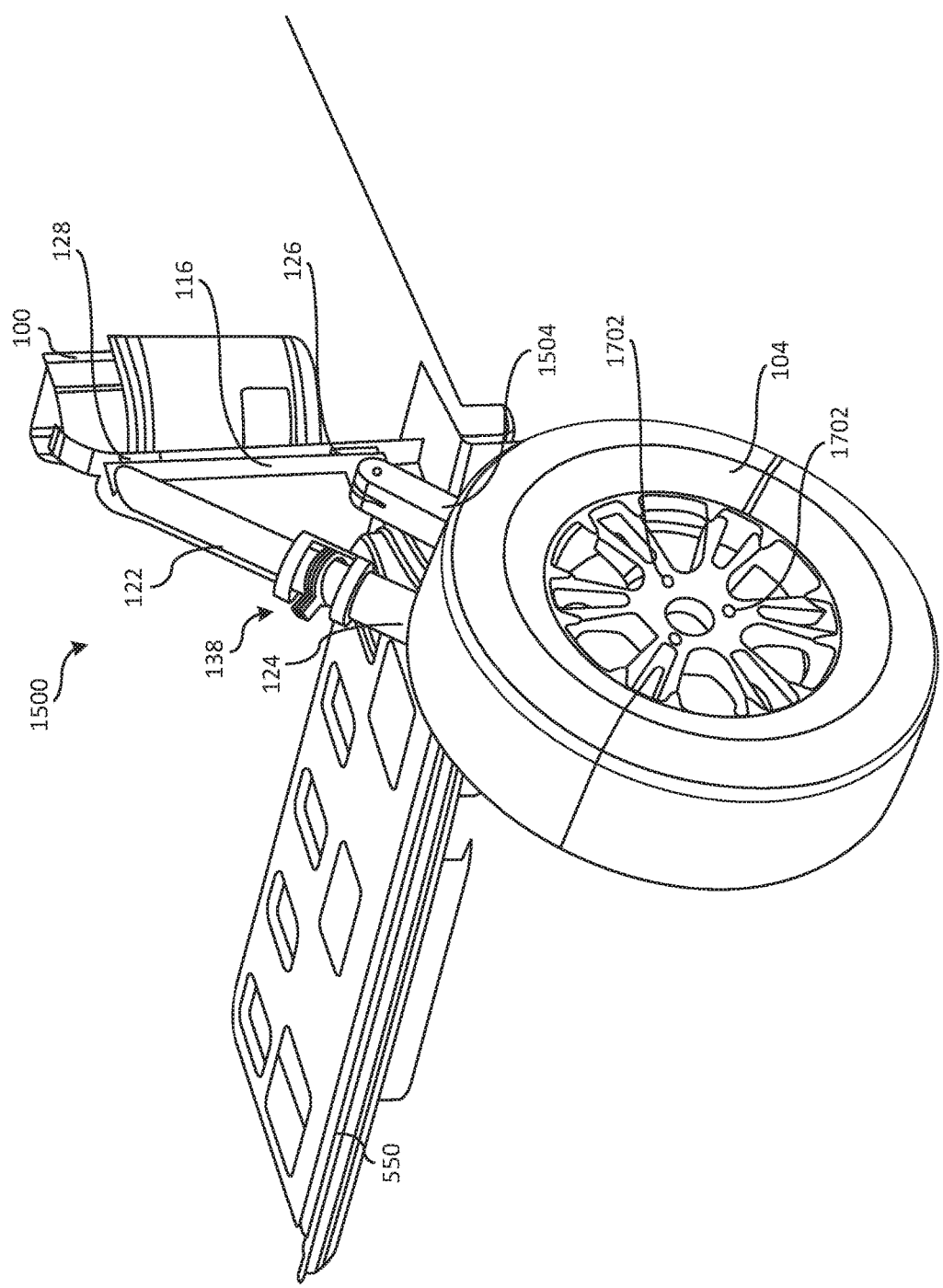
FIG. 17 illustrates another isometric view of the example tire carrier of FIG. 15 in the lowered position.

FIG. 17 illustrates another isometric view of the example tire carrier 1500 in the lowered position with the tire 104 engaging the ground and the tailgate 550 in the lowered position. As shown in FIG. 17, the lugs 1702 of the mount 1518 extend through the rim 112.

Figure 18:
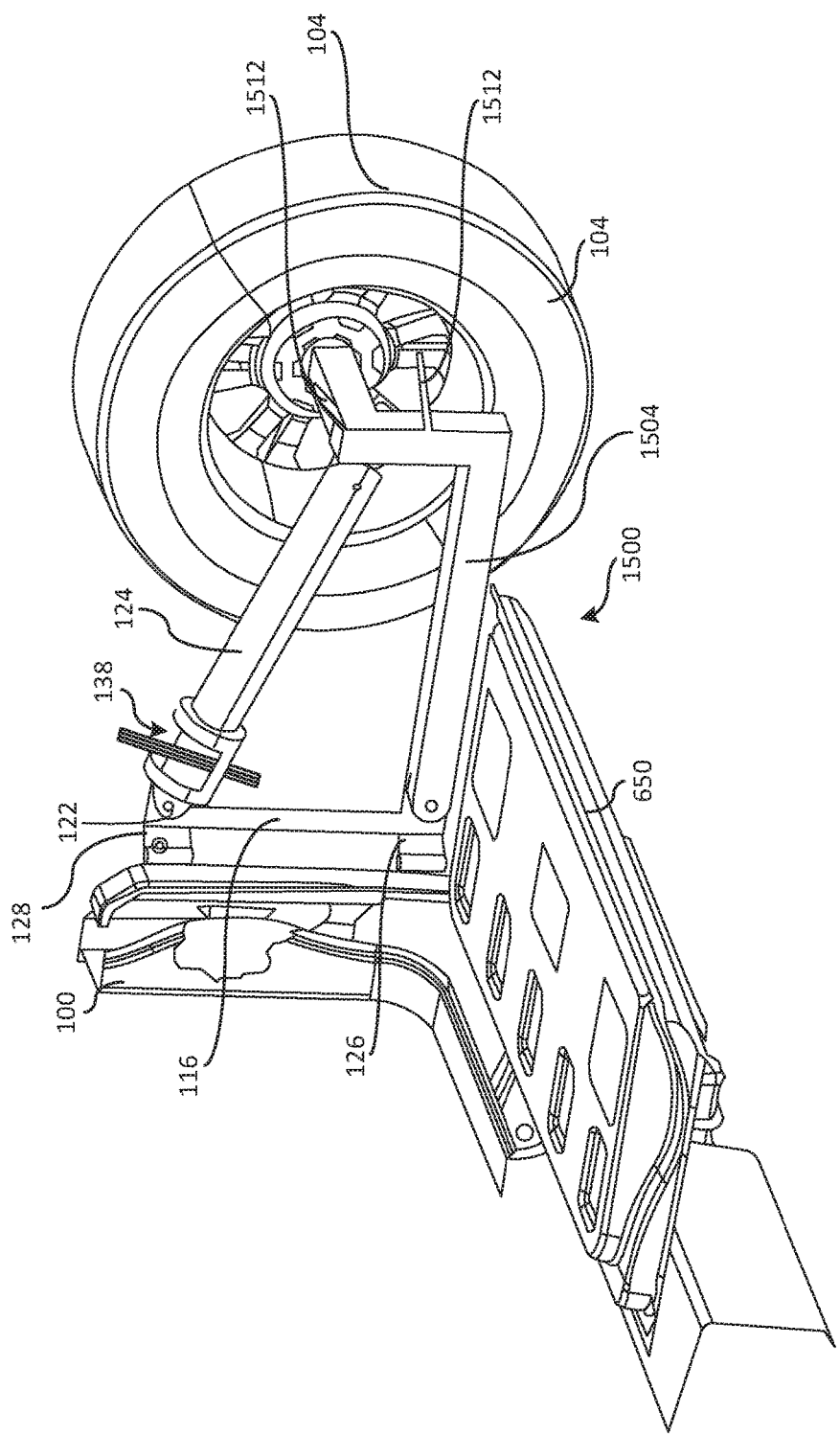
FIG. 18 illustrates an isometric view of the example tire carrier of FIG. 15 in the raised position with a distal end of the tire carrier spaced from the vehicle.
Figure 19:
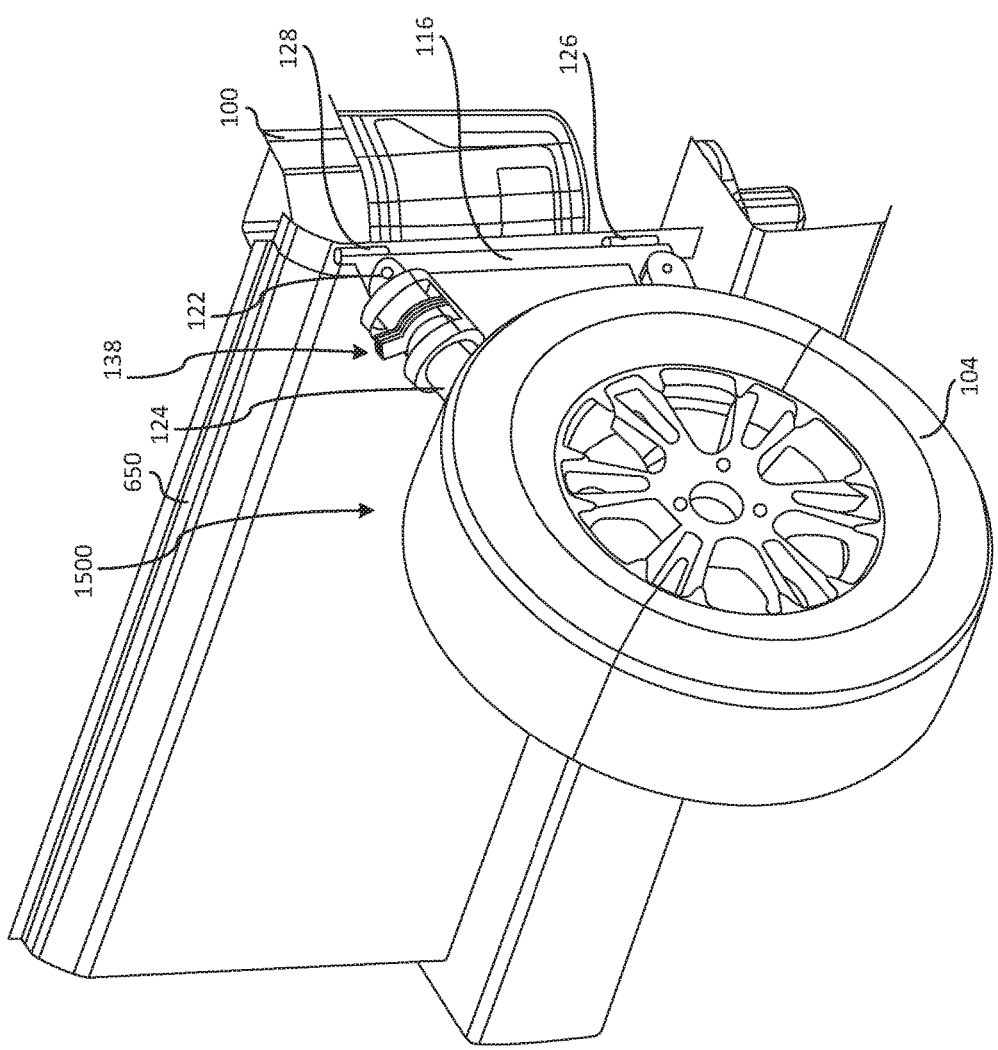
FIG. 19 illustrates another isometric view of the example tire carrier of FIG. 15 in a raised position with the distal end of the tire carrier spaced from the vehicle.
Figure 20:
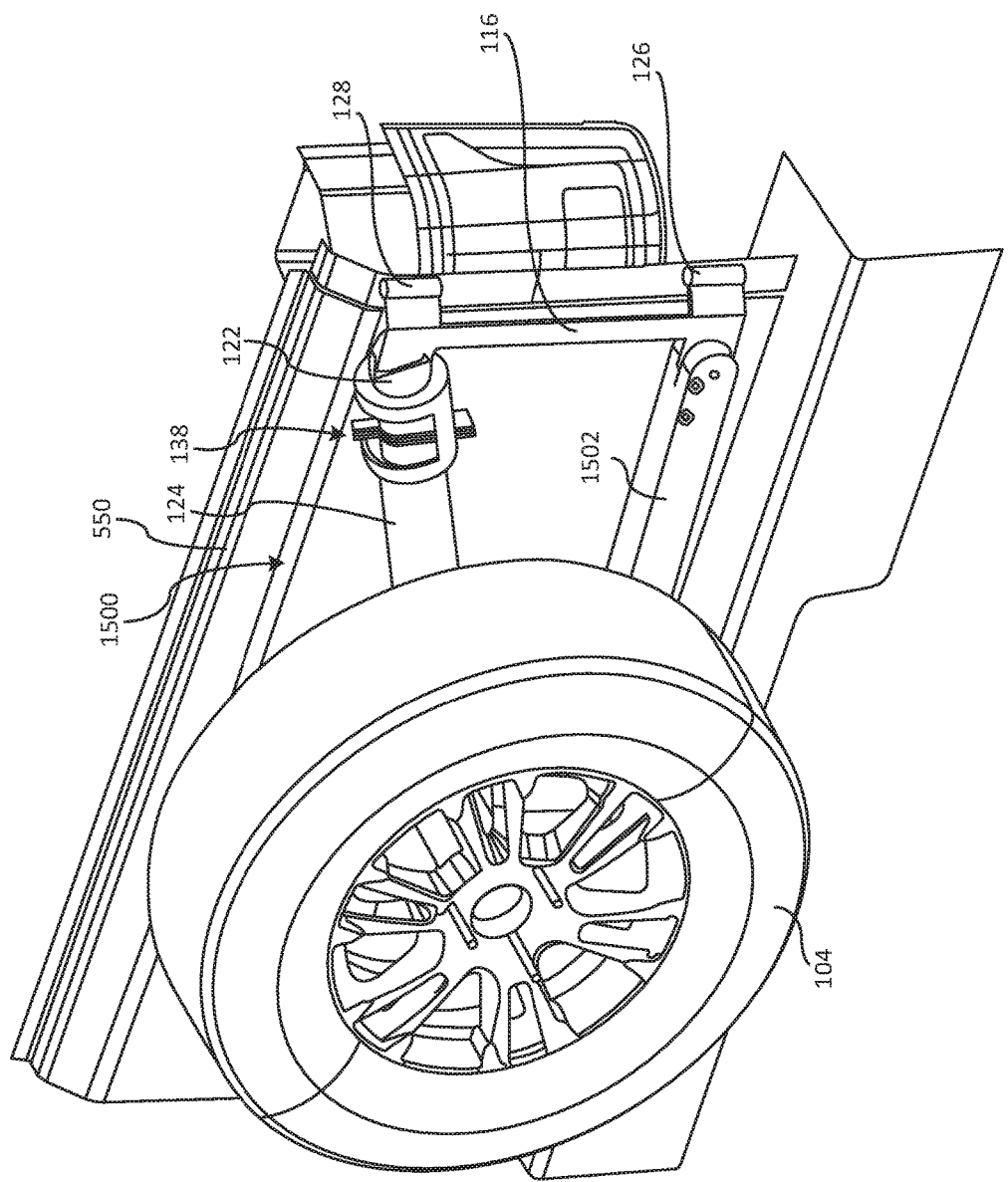
FIG. 20 illustrates an isometric view of the example tire carrier of FIG. 15 in the raised position with a distal end of the tire carrier immediately adjacent the vehicle.

FIG. 18 illustrates the example tire carrier 1500 in a raised position with the tire 104 spaced from the vehicle 100 and the tailgate 650 in the lowered position. FIG. 19 illustrates another isometric view of the example tire carrier 1500 with the example tire carrier 1500 in the raised position, the tire 104 spaced from the vehicle 100 and the tailgate 650 in the raised position. FIG. 20 illustrates an isometric view of the example tire carrier 1500 in the raised position with the tire 104 positioned immediately adjacent the vehicle 100 in the stowed position (e.g., the position that tire carrier 1500 is in when the vehicle 100 is driven).

Figure 21:
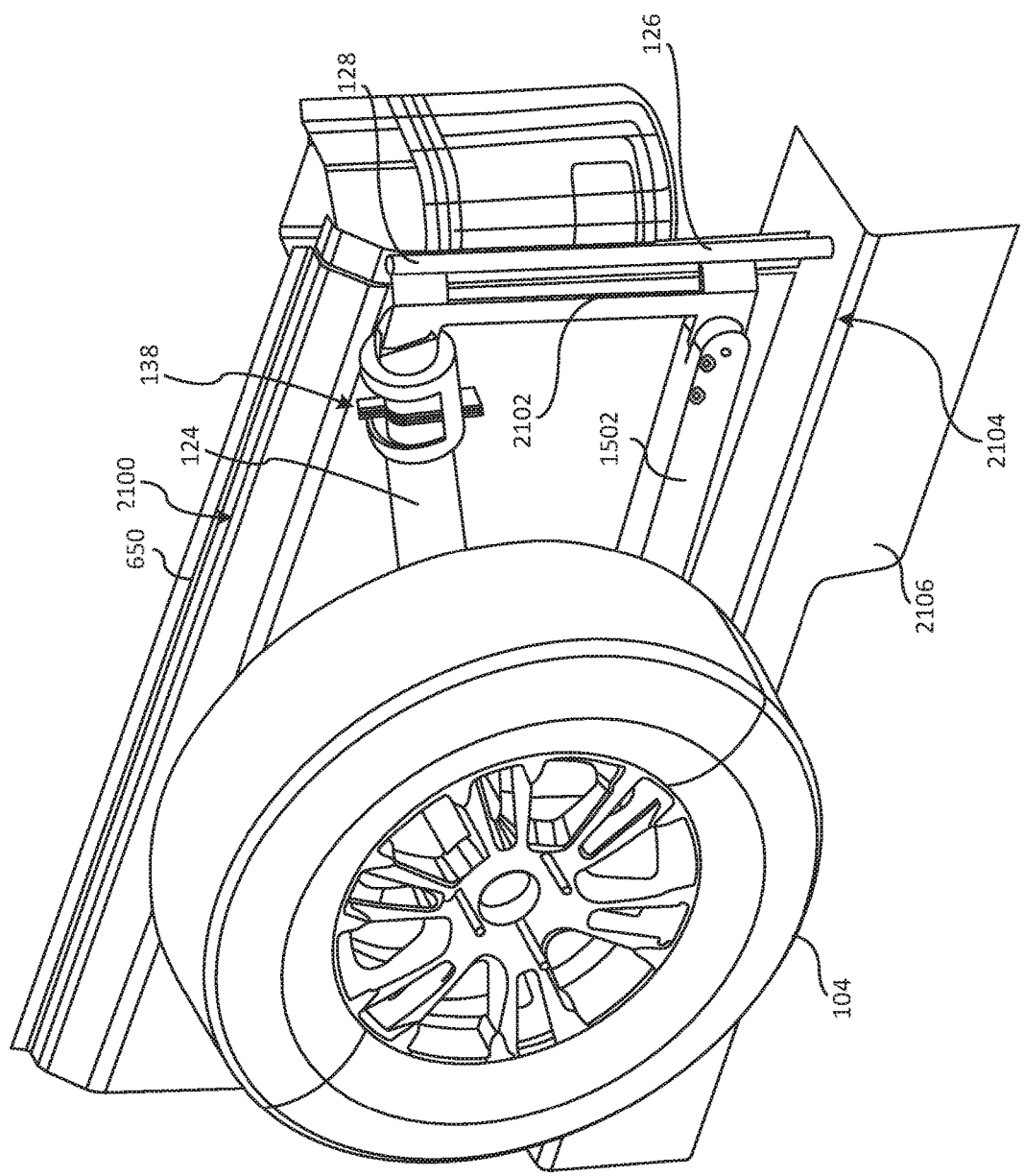
FIG. 21 illustrates an isometric view of another example tire carrier in a raised position with a distal end of the tire carrier immediately adjacent the vehicle.

FIG. 21 illustrates an example tire carrier 2100 that is similar to the tire carrier 1500 of FIG. 15. However, in contrast to the tire carrier 1500 of FIG. 15, the tire carrier 2100 includes an example second leg, tube or elongate member 2102 that is received in a pivotal coupling 2104. In this example, the pivotal coupling 2104 is formed at an example bumper 2106 of the vehicle 100. In some example, the pivotal coupling 2104 is formed of a cylinder that rotatably receives the second leg 2102 to enable the tire carrier 2100 to pivot relative to the vehicle 100 while retaining the second leg 2102 within the pivotal coupling 2104 to prevent the tire carrier 2100 from being inadvertently released from the vehicle 100. As shown in the example of FIG. 21, the tire carrier 2100 is in the raised position with the tire 104 immediately adjacent the vehicle 100.

Figure 22:
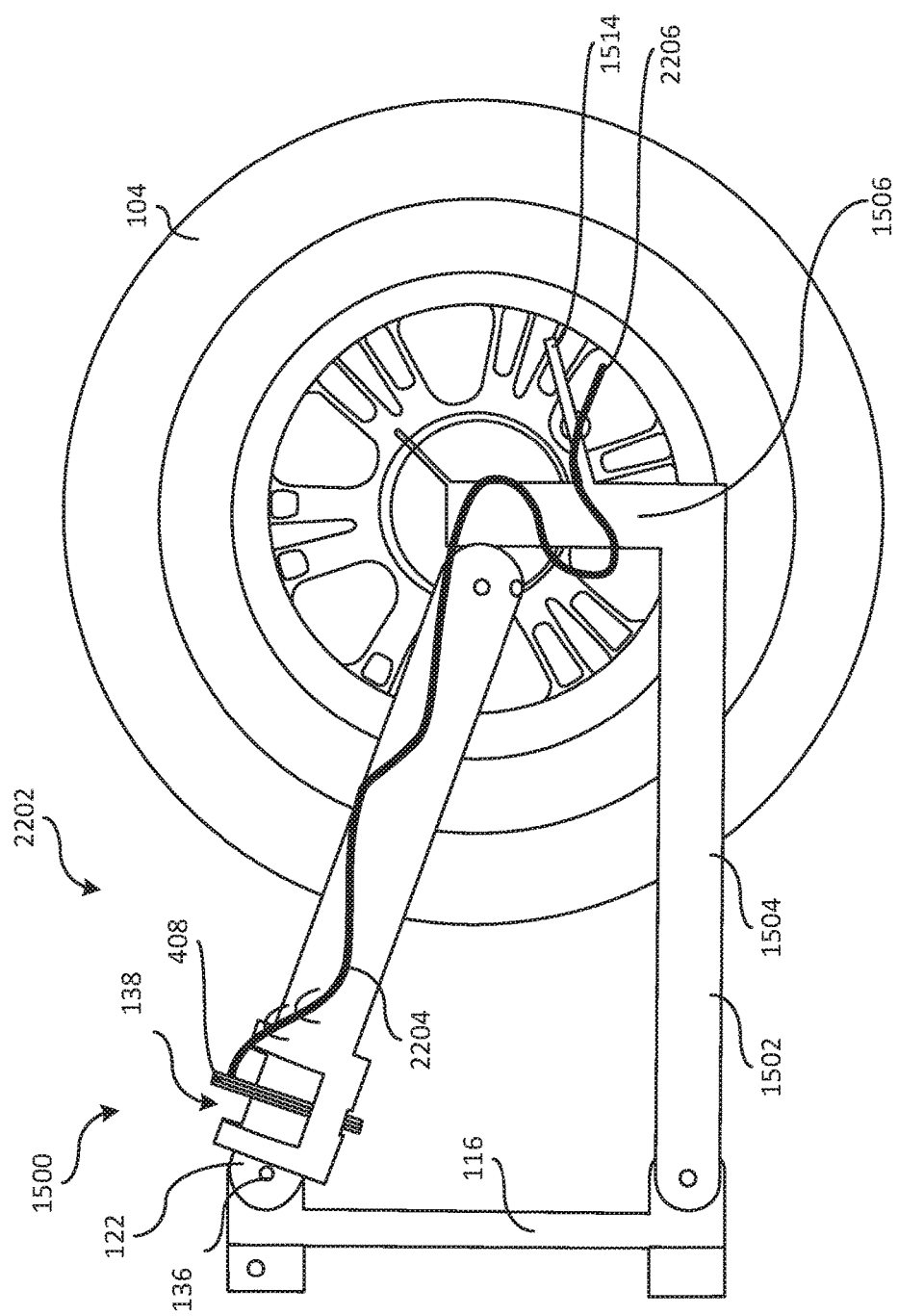
FIG. 22 illustrates a front view of an example tire carrier including an example actuator to actuate an example lock.

FIG. 22 illustrates the example tire carrier 1500 of FIG. 15 including an example actuator 2202 to actuate the lock 138 between a locked position in which the plates 408 mechanically engage the third tube 122 and an unlocked position in which the plates 408 unengage the third tube 122 and/or enable the tubes 122, 124 to move relative to one another. In the illustrated example, the actuator 2202 includes an example cable 2204 coupled to the plates 408 and an example handle 2206 pivotably coupled to the third lug 1514.

In the illustrated example, to actuate the lock 138 toward the unlocked position, the handle 2206 of the actuator 2202 is moved toward third lug 1514. In the illustrated example, to enable the lock 138 to move toward the locked position, the handle 2206 is released to enable the handle 2206 to move away from the third lug 1514. Of course, the actuator 2202 may be structured to release the lock 138 in any suitable way. In some examples, the actuator 2202 is biased toward the locked position. Thus, in some such examples, when the handle 2206 is released, the handle 2206 automatically moves to enable the lock 138 to return to the locked position in which the third and fourth tubes 122, 124 are secured relative to each other.

FIG. 23 illustrates an example tire carrier 2300 that is substantially similar to the tire carrier 1500 of FIG. 15. However, in contrast to the tire carrier 1500 of FIG. 15, the tire carrier 2300 of FIG. 23 includes example third and fourth legs, tubes or elongated members 2302, 2304 defining apertures 2306, 2308. In this example, the apertures 2306, 2308 are positioned to align when the example tire carrier 2300 is in the raised position to enable an example second lock 2310 to be formed when the apertures 2306, 2308 receive an example pin 2312. Thus, the example second lock 2310 prevents the tire carrier 2300 from lowering even if the lock 138 is inadvertently actuated. To prevent the pin 2312 from being inadvertently removed from the apertures 2306, 2308, in some examples, the pin 2312 receives a cotter pin or any other device.

From the foregoing, it will be appreciated that example methods, apparatus and articles of manufacture have been disclosed that relate to spare tire carriers for vehicles. In some examples, the spare tire carriers are adjustable to a lowered position to enable a spare tire to be easily aligned with lugs of the spare tire carrier without having to lift the spare tire off the ground or at least reducing the distance to lift the spare tire to mount the spare tire on the tire carrier. In some examples, in the lowered position, a step of the spare tire carrier is positionable in a location to enable a person to more easily access an interior of a vehicle implemented with the teachings of this disclosure and/or more easily access a top of a vehicle implemented with the teachings of this disclosure.

In some examples, the telescopically coupled tubes of the example tire carriers are not threadably engaged (e.g., no threaded coupling). Thus, in some such examples, one of the telescopically coupled tubes is not implemented with a ball screw and the other of the telescopically coupled tubes of the example tire carriers is not implemented with a ball nut. In other words, in some examples, the telescopically coupled tubes of the example tire carriers are not structured to purposefully rotate relative to one another when the example tire carrier is either moved from the raised position to the lowered position or moved from the lowered position to the raised position. In some examples, the coupling between the telescopically coupled tubes of the example tire carriers does not include a hydraulic actuator. In some examples, neither of the telescopically coupled tubes of the example tire carriers includes a piston that engages (e.g., sealingly engages) within an interior surface of the other of the telescopically coupled tubes to purposefully change a rate at which the tire carrier descends toward a lowered position or purposefully changes a rate at which the tire carrier ascends toward the raised position. In other words, in some examples, gas or liquid (e.g., fluid) is not purposefully compressed or decompressed to purposefully change a rate at which the tire carrier moves when one of the telescopically coupled tubes is moved into the other of the telescopically coupled tubes and/or when one of the telescopically coupled tubes is moved out of the other of the telescopically coupled tubes (e.g., no fluid coupling).

An example tire carrier, includes a frame including telescopically coupled tubes; and a lock carried by one of the tubes, the lock structured to mechanically engage another one of the tubes to fix the tubes relative to one another to prevent the tire carrier from inadvertently moving toward a lowered position, the lock structured to reduce the mechanical engagement with the other one of the tubes to enable the tire carrier to be moved toward a raised position.

In some examples, the tire carrier includes a lug carried by the frame, the lug structured to be used as a step when the tire carrier is in the lowered position. In some examples, the lug includes a slip-resistant layer. In some examples, the lug is structured to be used as a handle to assist in moving the tire carrier toward the raised position or moving the tire carrier toward the lowered position. In some examples, the lock includes an actuator to reduce the mechanical engagement between the other one of the tubes to enable the tire carrier to be moved toward the lowered position. In some examples, the lock includes a bracket and a plate including opposing first and second tabs, the other one of the tubes to extend through the plate, the bracket includes first and second stops that are engagable by the first and second tabs, wherein, to cause the plate to mechanically engage the other one of the tubes, the first and second stops are offset relative to one another to cause a longitudinal axis of the plate to be non-perpendicular relative to a longitudinal axis of the other one of the tubes when the plate engages the first and second stops.

In some examples, the lock further includes a biasing element disposed within the bracket to urge the plate to engage the first and second stops. In some examples, when the tire carrier is moved toward the raised position, the other one of the tubes is structured to move the plate against a biasing force of the biasing element to reduce the mechanical engagement by the plate with the other one of the tubes. In some examples, the lock is a first lock, further including a second lock to prevent the plate from inadvertently reducing the mechanical engagement with the other one of the tubes. In some examples, the frame is to be hingably coupled to a vehicle. In some examples, the one of the tubes is to be hingably coupled to the vehicle.

An example tire carrier, includes telescopically coupled tubes; and means for selectively engaging one of the tubes to prevent the tire carrier from inadvertently moving toward a lowered position. In some examples, the means for selectively engaging the one of the tubes includes a lock carried by another one of the tubes, the lock structured to enable the tire carrier to move toward a raised position. In some examples, the lock includes a bracket and a plate including opposing first and second tabs, the one of the tubes to extend through the plate, the bracket defines first and second slots including first and second stops that are engagable by the first and second tabs to cause the plate to mechanically engage the one of the tubes. In some examples, the first and second stops are offset relative to one another to cause a longitudinal axis of the plate to be non-perpendicular relative to a longitudinal axis of the one of the tubes when the plate engages the first and second stops to cause the plate to mechanically engage the one of the tubes to fix the relative positions of the tubes.

In some examples, the tubes include first and second tubes, further including a first leg and a second leg, wherein, to enable the tire carrier to move to the lowered position, the first leg is rotatably coupled to the first tube, the second leg is rotatably coupled to the second tube, and the first leg is rotatably coupled to second leg. In some examples, the first leg is to be Hing ably coupled to a vehicle. In some examples, the first tube defines a first slot to receive a first lug of the first leg to rotatably couple the first tube and the first leg and the second tube defines a second slot to receive a second lug of the second leg to rotatably couple the second lug and the second leg.

An example tire carrier includes a frame including first and second legs, the first and second legs movable between a contracted position in which the frame is in a raised position and an expanded position in which the frame is in a lowered position; and a lock carried at an end of the first leg, the lock structured to selectively engage the second leg to prevent the frame from inadvertently moving toward the expanded position, the lock structured to reduce the engagement with the second leg when the frame is moving toward the contracted position. In some examples, the lock includes an actuator to reduce the engagement with the second leg to enable the tire carrier to be moved toward the lowered position.

An example apparatus includes a tire carrier movable between a raised position and a lowered position, the tire carrier, including a first tube; a second tube; a third tube; and a fourth tube, the first tube rotatably coupled to the second tube, the second tube rotatably coupled to the third tube, the third tube telescopically coupled to the fourth tube; and a lock carried by one of the third tube or the fourth tube, the lock structured to mechanically engage the other of the third tube or the fourth tube to fix the third and fourth tubes relative to one another to prevent the tire carrier from inadvertently moving toward the lowered position, the lock structured to reduce the mechanical engagement with the other of the third tube or the fourth tube to enable the tire carrier to be moved toward the raised position.

In some examples, the apparatus includes a lug carried by the first tube, the lug structured to be used as a step when the tire carrier is in the lowered position. In some examples, the lug includes a slip-resistant layer. In some examples, the lug is structured to be used as a handle to assist in moving the tire carrier toward the raised position or moving the tire carrier toward the lowered position.

In some examples, the lock includes an actuator actuatable to reduce the mechanical engagement between the other of the third tube or the fourth tube to enable the tire carrier to be moved toward the lowered position. In some examples, the lock includes a bracket and a plate including opposing first and second tabs, the other of the third or fourth tubes to extend through the plate, the bracket includes first and second stops that are engagable by the first and second tabs, to cause the plate to mechanically engage the other of the third tube or the fourth tube, the first and second stops being offset relative to one another to cause a longitudinal axis of the plate to be non-perpendicular relative to a longitudinal axis of the other of the third or fourth tubes when the plate engages the first and second stops. In some examples, the lock further includes a biasing element disposed within the bracket to urge the plate to engage the first and second stops.

In some examples, the tire carrier is moved toward the raised position, the other of the third or fourth tubes is structured to move the plate against a biasing force of the biasing element to reduce mechanical engagement by the plate with the other of the third or fourth tubes. In some examples, the lock is a first lock, further including a second lock to prevent the plate from inadvertently reducing the mechanical engagement with the other of the third or fourth tubes. In some examples, the second tube is to be hingably coupled to a vehicle. In some examples, the apparatus includes a fifth tube disposed between the first tube and the fourth tube, the fourth and fifth tubes being rotatably coupled. In some examples, one of the third tube or the fourth tube is to be hingably coupled to a vehicle.

An example apparatus includes a tire carrier including means for preventing the tire carrier from inadvertently moving toward a lowered position, the means for preventing including means for enabling the tire carrier to move toward the lowered position without a threaded coupling and without a fluid coupling that purposefully changes a rate at which the tire carrier moves toward the lowered position. In some examples, the tire carrier includes first and second tubes that are telescopically coupled, the means for enabling includes a lock carried by the first tube, the lock structured to enable the tire carrier to move toward a raised position. In some examples, the lock is structured to mechanically engage the second tube to fix the first and second tubes relative to one another to prevent the tire carrier from inadvertently moving toward the lowered position. In some examples, the lock includes a bracket and a plate including opposing first and second tabs, the second tube to extend through the plate, the bracket defines first and second slots including first and second stops that are engagable by the first and second tabs to cause the plate to mechanically engage the second tube. In some examples, the first and second stops are offset relative to one another to cause a longitudinal axis of the plate to be non-perpendicular relative to a longitudinal axis of the second tube when the plate engages the first and second stops to cause the plate to mechanically engage the second tube to fix the relative positions of the first and second tubes.

An example apparatus, includes a tire carrier movable between a raised position and a lowered position, the tire carrier, including first and second tubes telescopically coupled at a non-threaded coupling; and a lock carried by the first tube and structured to mechanically engage the second tube to fix relative positions of the first and second tubes and to prevent the tire carrier from inadvertently moving toward the lowered position. In some examples, the lock includes an actuator movable to reduce the mechanical engagement with the second tube to enable the tire carrier to be moved toward the lowered position. In some examples, the tire carrier includes a lug structured to be used as a step when the tire carrier is in the lowered position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A tire carrier, comprising:
a frame including telescopically coupled tubes; and
a lock carried by one of the tubes, the lock structured to mechanically engage another one of the tubes to fix the tubes relative to one another to prevent the tire carrier from inadvertently moving toward a lowered position, the lock structured to reduce the mechanical engagement with the other one of the tubes to enable the tire carrier to be moved toward a raised position, and wherein the lock includes:
a bracket having first and second stops;
a plate having opposed first and second tabs, the other one of the tubes to extend through the plate, the first and second stops being engageable by the first and second tabs; and
a biasing element disposed within the bracket to urge the plate to engage the first and second stops, the biasing element having an aperture to receive at least one of the tubes.

2. The tire carrier of claim 1, further including a lug carried by the frame, the lug structured to be used as a step when the tire carrier is in the lowered position.

3. The tire carrier of claim 2, wherein the lug includes a slip-resistant layer.

4. The tire carrier of claim 2, wherein the lug is structured to be used as a handle to assist in moving the tire carrier toward the raised position or moving the tire carrier toward the lowered position.

5. The tire carrier of claim 1 wherein, to cause the plate to mechanically engage the other one of the tubes, the first and second stops are offset relative to one another to cause a longitudinal axis of the plate to be non-perpendicular relative to a longitudinal axis of the other one of the tubes when the plate engages the first and second stops.

6. The tire carrier of claim 1, wherein, when the tire carrier is moved toward the raised position, the other one of the tubes is structured to move the plate against a biasing force of the biasing element to reduce the mechanical engagement by the plate with the other one of the tubes.

7. The tire carrier of claim 1, further including at least a second plate.

8. The tire carrier of claim 1, wherein the frame is to be hingably coupled to a vehicle.

9. The tire carrier of claim 8, wherein the one of the tubes is to be hingably coupled to the vehicle.

10. A tire carrier comprising:
a first tube having an opening;
a bracket formed at a first end of the first tube, the bracket having a first wall and a second wall spaced from the first wall;
a second tube to be slidably coupled to the first tube;
a plate having an aperture to receive the second tube and positioned between the first wall and the second wall of the bracket, the plate movable relative to the second tube between a first position to reduce a frictional force imparted to the second tube and enable the second tube to slide relative to the first tube and a second position to increase a frictional force imparted to the second tube to prevent the second tube from sliding relative to the first tube; and
a spring positioned between the plate and the first tube to bias the plate toward the first position, the spring having an aperture to receive the second tube.

11. The tire carrier of claim 10, wherein the second tube is to slide in the opening of the first tube in a first direction to raise a wheel coupled to the second tube and a second direction to lower the wheel.

12. The tire carrier of claim 10, wherein the plate and the bracket are structured to cause the plate to move to the second position when a force is imparted in a direction along a longitudinal axis of the second tube and toward the first tube.

13. A tire carrier comprising:
a telescoping frame movable between a first position to lower a wheel from a tailgate of a vehicle and a second position to raise the wheel to the tailgate; and
a lock carried by the telescoping frame, the lock including:
a plate having an aperture to receive at least a portion of the telescoping frame, the plate configured to pivot relative to a longitudinal axis of the telescoping frame between a first position to move the lock to a latch position to prevent telescopic movement of the telescoping frame and a second position to move the lock to an unlatched position to allow telescopic movement of the telescoping frame; and
a biasing element to bias the plate toward the latched position, the biasing element having an aperture to receive at least a portion of the telescoping frame.

14. The tire carrier of claim 13, wherein the plate includes a tab to enable movement of the plate to the unlatched position.

15. The tire carrier of claim 14, wherein the plate moves to the unlatched position in response to a force imparted to the tab in a direction opposite a force of the biasing element.

16. The tire carrier of claim 14, further including a bracket to retain the plate coupled to the telescoping frame.

17. The tire carrier of claim 16, wherein the telescoping frame includes a first tube and a second tube, the first tube being telescopically coupled relative to the second tube.

18. The tire carrier of claim 17, wherein the bracket is carried by the first tube and the bracket defines a cavity to receive the plate.

19. The tire carrier of claim 13, wherein a longitudinal axis of the aperture of the plate is coaxially aligned with a longitudinal axis of the telescoping frame when the plate is in the unlatched position and the longitudinal axis of the aperture of the plate is angled relative to the longitudinal axis of the telescoping frame when the plate is in the latched position.

* * * * *